(12) United States Patent
Goebbert et al.

(10) Patent No.: US 11,215,577 B2
(45) Date of Patent: Jan. 4, 2022

(54) TEST SYSTEM FOR ANALYZING A SAMPLE OF A BODILY FLUID

(71) Applicant: Roche Diagnostics Operations, Inc., Indianapolis, IN (US)

(72) Inventors: Uwe Goebbert, Mannheim (DE); Eloísa Lopez-Calle, Ludwigshafen (DE); Michael Marquant, Mannheim (DE); Christine Nortmeyer, Mannheim (DE); Katja Reiter, Bobenheim-Roxheim (DE); Reiner Stein, Bad Kreuznach (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 381 days.

(21) Appl. No.: 16/185,210

(22) Filed: Nov. 9, 2018

(65) Prior Publication Data

US 2019/0079045 A1    Mar. 14, 2019

Related U.S. Application Data

(63) Continuation of application No. PCT/EP2017/064767, filed on Jun. 16, 2017.

(30) Foreign Application Priority Data

Jun. 17, 2016   (EP) .................................... 16174884

(51) Int. Cl.
*G01N 27/327*    (2006.01)
*B01L 3/00*    (2006.01)
*G01N 21/78*    (2006.01)

(52) U.S. Cl.
CPC ...... *G01N 27/3273* (2013.01); *B01L 3/50273* (2013.01); *B01L 3/502715* (2013.01);
(Continued)

(58) Field of Classification Search
CPC ................... G01N 33/92; G01N 24/00; G01N 2035/00702; G01N 2800/52
See application file for complete search history.

(56) References Cited

U.S. PATENT DOCUMENTS

| 5,731,212 A | 3/1998 | Gavin et al. |
| 2005/0214171 A1 | 9/2005 | Gerstle et al. |

(Continued)

FOREIGN PATENT DOCUMENTS

| EP | 2145682 A1 | 1/2010 |
| JP | 2006-119127 A | 5/2006 |

(Continued)

OTHER PUBLICATIONS

Hoenes, Joachim et al., The Technology Behind Glucose Meters: Test Strips, Diabetes Technology & Therapeutics, 2008, pp. S-10-S-26, vol. 10, Supplement 1.

(Continued)

*Primary Examiner* — Christopher Adam Hixson
(74) *Attorney, Agent, or Firm* — Roche Diagnostics Operations, Inc.

(57) ABSTRACT

A test system for analyzing a sample of a bodily fluid is provided and comprises: at least one test strip comprising at least one capillary channel comprising an inlet opening configured to receive the sample; a vent opening configured to provide an air vent to the capillary channel; and at least one zone consisting of a detection zone and a reagent zone; at least one measuring device configured for interacting with the test strip, the measuring device comprising at least one sealing element for hermetically sealing the vent opening from an ambient atmosphere; and at least one suction device adapted to provide an underpressure to the vent opening; wherein the measuring device further comprises at least one valve or is connectable to the valve, wherein the valve is
(Continued)

configured to vent the vent opening of the test strip when the measuring device interacts with the test strip.

21 Claims, 6 Drawing Sheets

(52) U.S. Cl.
CPC ........ *B01L 3/502738* (2013.01); *G01N 21/78* (2013.01); *B01L 2200/02* (2013.01); *B01L 2300/0645* (2013.01); *B01L 2300/0825* (2013.01); *B01L 2400/0406* (2013.01); *B01L 2400/049* (2013.01); *B01L 2400/0688* (2013.01); *B01L 2400/0694* (2013.01)

(56) References Cited

U.S. PATENT DOCUMENTS

| | | |
|---|---|---|
| 2011/0212538 A1 | 9/2011 | Lundgreen et al. |
| 2012/0021451 A1 | 1/2012 | Matsumoto et al. |
| 2012/0178179 A1* | 7/2012 | Kim ................ B01L 3/502738 436/180 |
| 2015/0087077 A1 | 3/2015 | Mucci et al. |
| 2015/0233817 A1 | 8/2015 | Lundgreen et al. |

FOREIGN PATENT DOCUMENTS

| | | |
|---|---|---|
| JP | 2010-266453 A | 11/2010 |
| WO | 2003/010530 A1 | 2/2003 |
| WO | 2003/025559 A1 | 3/2003 |
| WO | 2010/040657 A1 | 4/2010 |
| WO | 2013/096804 A2 | 6/2013 |
| WO | 2014/198428 A1 | 12/2014 |

OTHER PUBLICATIONS

International Search Report dated Aug. 30, 2017, in Application No. PCT/EP2017/064767, 2 pp.

\* cited by examiner

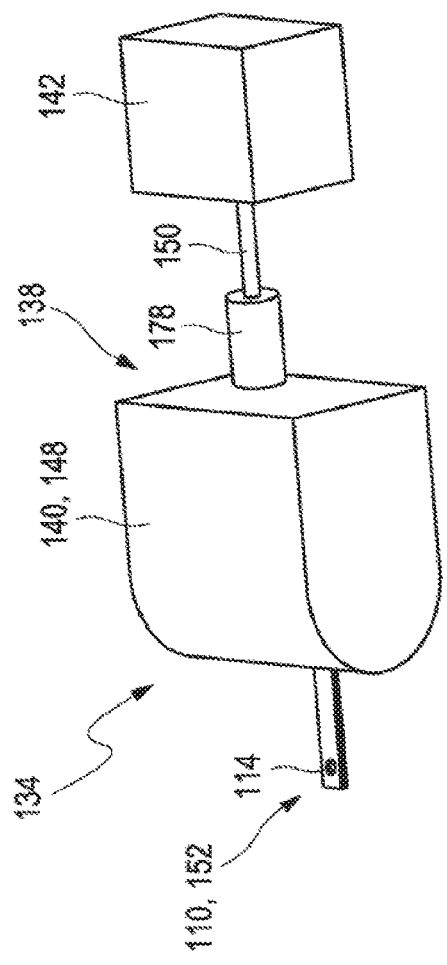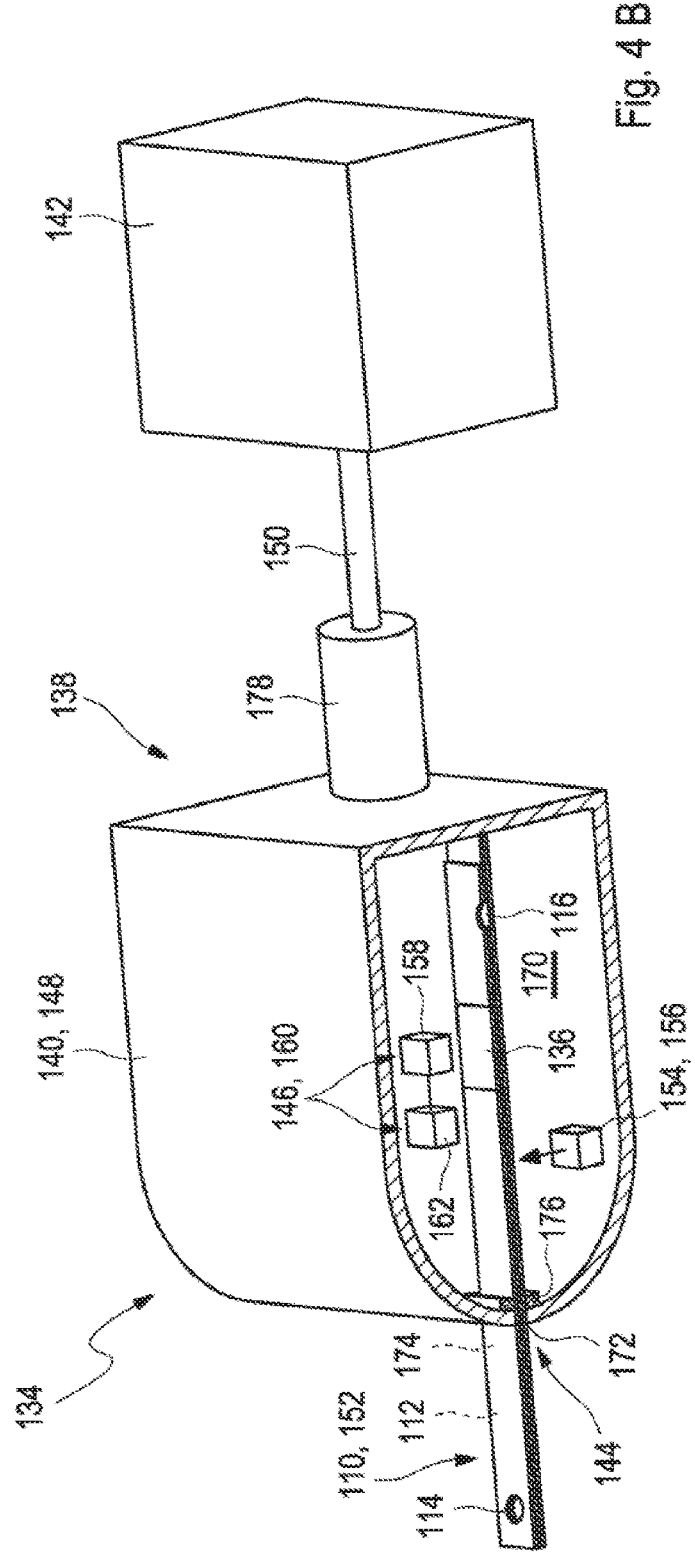

TEST SYSTEM FOR ANALYZING A SAMPLE OF A BODILY FLUID

CROSS-REFERENCE TO RELATED APPLICATIONS

This application is a continuation of International Patent Application No. PCT/EP2017/064767, filed 16 Jun. 2017, which claims the benefit of European Patent Application No. 16174884.3, filed 17 Jun. 2016, the disclosures of which are hereby incorporated herein by reference in their entirety.

TECHNICAL FIELD

The present disclosure relates to a test system for analyzing a sample of a bodily fluid, a method for controlling a transport of a sample of bodily fluid within a test strip and a method for analyzing a sample of a bodily fluid. The device and methods according to the present disclosure specifically may be used to control a transport of a sample of bodily fluid within a test strip. In particular, the device and the method may be applied in the field of qualitatively and/or quantitatively detecting one or more analytes such as glucose, lactate, triglycerides, cholesterol or other analytes, typically metabolites, in one or more body fluids such as blood, typically whole blood, plasma, serum, urine, saliva, interstitial fluid or other body fluids, both in the field of professional diagnostics and in the field of home monitoring. However, other fields of application are feasible.

BACKGROUND

In the field of medical technology and diagnostics a large number of devices and methods for detecting at least one analyte in a bodily fluid are known. The devices and methods may be used for detecting at least one analyte present in one or both of a body tissue or a body fluid, in particular one or more analytes such as glucose, lactate, triglycerides, cholesterol or other analytes, typically metabolites, in bodily fluids such as blood, typically whole blood, plasma, serum, urine, saliva, interstitial fluid or other body fluids. Further devices are known for measuring activating times, e.g., a thrombin activation time measurement for coagulation monitoring.

The detection of at least one analyte present in one or both of a body tissue or a bodily fluid as well as corresponding medication is an essential part of daily routine for many patients. In order to increase convenience and in order to avoid restricting the daily routine by more than a tolerable degree, many test devices and test elements are known in the art and commercially available.

A large number of test devices and test systems are known which are based on the use of test elements in the form of test strips, in particular capillary test strips. Therein, capillary test strips usually comprise an inlet opening configured to receive an amount of bodily fluid and a vent opening configured to provide an air vent to the capillary channel.

Further, in many cases, the test strips comprise one or more test fields having one or more test chemistries or test chemicals. The test chemicals are typically adapted to change one or more detectable properties in the presence of the at least one analyte to be detected. Thus, electrochemically detectable properties of the test chemistry and/or optically detectable properties of the test chemistry may be changed due to the influence of the presence of the analyte. For potential test chemicals, also referred to as test chemistries, which may be used within the present disclosure, reference may be made to J. Hönes et al.: Diabetes Technology and Therapeutics, Vol. 10, Supplement 1, 2008, S-10 to S-26. However, other types of test chemistries may be used within the present disclosure.

In some embodiments, the detection of the at least one analyte can be performed by using an electrochemical test element. Such test elements typically comprise at least one working electrode for detecting the analyte as well as at least one counter electrode to support a current flow through a measuring cell of the test element. In addition, optionally, the test element may comprise at least one reference electrode. Additionally, or alternatively, at least one reference electrode may be combined with at least one counter electrode. However, other types of measurement setups are possible, in order to derive an analyte concentration from a comparison of electrode potentials. The test strips are typically connected with a related instrument before the sample is dosed to the strip to allow a controlled and defined measurement sequence.

For certain capillary test strip concepts, the sample has to be transported over long distances within the capillary channel from the inlet opening to a zone where the optical and/or electrical detection occurs. Often, blood samples show high viscosities especially in case of high hematocrit levels or at low temperatures. As a result, several actions have to be taken to provide a reliable and reproducible sample transport by just capillary forces. First, a preparation of the capillary walls with detergents is advantageous to provide a very good wettability of the capillary walls suitable for a wide range of sample material properties as well as to enable a regulation of a flow of the sample in the capillary channel. However, the usage of detergents also entails the risk that these detergents interfere with the detection chemistry and thereby have an effect on the analysis result. Second, the size of the cross section in most cases has to be adapted to the amount and dimensions of erythrocytes to provide a sufficient transport of blood samples even with high hematocrit levels. However, this requirement typically leads to the necessity of higher sample volumes. Third, a maximum length of a capillary has to be considered in order to provide a filling just by capillary forces. However, this typically leads to an exclusion of otherwise preferred test strip concepts.

In summary, passive sample transport by capillary forces is limited through several disadvantages and/or technical challenges. To overcome the above mentioned drawbacks, an active triggering and/or regulation of the sample transport within the capillary channel is therefore desirable.

Active transport elements can be implemented within a test element. However, if active transport elements are implemented within a disposable test element, especially within a test strip, the production process typically becomes significantly more complex compared to simple reel to reel produced test strips made from foils. Consequently, in many cases, production costs and prices for the test elements increase significantly.

In US 2012/0178179 A1 a diagnostic cartridge and a control method for the diagnostic cartridge are disclosed. The cartridge includes a sample port through which a sample is injected, a first chamber moving the sample injected from the sample port, a second chamber moving a substrate solution, a first membrane formed at a distal end of the first chamber to function as a valve for preventing other substances from being injected into the first chamber after the sample is completely moved, and a second membrane formed at a distal end of the second chamber to function as a valve for preventing other substances from being injected into the first chamber after the substrate solution is completely moved.

Still, the cartridge disclosed by US 2012/0178179 A1 is highly complex and requires a sophisticated channel structure. Further, fluid control of liquids within the cartridge is fully performed by using external pumps, which implies the technical challenge of positioning the liquids in certain positions. Thus, once a pressure or a vacuum is applied to a suction opening of the cartridge, the pressure or vacuum spreads through the complex channel structure of the cartridge, and the liquids are moved accordingly. However, the movement or the stopping of a movement occurs in a highly uncontrollable and delayed fashion, which typically renders a precise positioning of the liquids nearly impossible. A precise positioning, however, including a controlled transport and a controlled standstill of liquids, is highly desirable for performing analytical measurements, specifically in case very small volumes of liquids are used, such as volumes of less than 1 µL or even less than 500 nL.

BRIEF SUMMARY

It is against the above background that the embodiments of the present disclosure provide certain unobvious advantages and advancements over the prior art. In particular, the inventors have recognized a need for improvements in a test system for analyzing a sample of a bodily fluid, a method for controlling a transport of a sample of bodily fluid within a test strip, and a method for analyzing a sample of bodily fluid.

Although the embodiments of the present disclosure are not limited to specific advantages or functionality, it is noted that means and methods are disclosed herein, which are applicable for analysis of very small amounts of liquid samples and which, still, allow for a precise positioning and a precisely controlled transport of the small amounts of liquid.

In accordance with one embodiment of the present disclosure, a test system for analyzing a sample of a bodily fluid is provided comprising: at least one test strip comprising at least one capillary channel, the capillary channel comprising an inlet opening configured to receive the sample of the bodily fluid; a vent opening configured to provide an air vent to the capillary channel; and at least one zone selected from the group consisting of a detection zone and a reagent zone; at least one measuring device configured for interacting with the test strip, the measuring device comprising at least one sealing element configured for hermetically sealing the vent opening of the test strip from an ambient atmosphere; and at least one suction device adapted to provide an underpressure to the vent opening; wherein the measuring device further comprises at least one valve or is connectable to the at least one valve.

In accordance with another embodiment of the present disclosure, a method for controlling a transport of a sample of bodily fluid within a test strip is provided, the method comprising using a test system as recited above, the method comprising the following steps: connecting the test strip to the measuring device; connecting the vent opening to an ambient atmosphere; applying the sample of bodily fluid to the inlet opening of the capillary channel; generating an initial flow of the sample of the bodily fluid by capillary force; and generating an underpressure in the capillary channel and achieving a subsequent flow of the sample of the bodily fluid, thereby transporting the sample of bodily fluid to the at least one zone selected from the group consisting of a detection zone and a reagent zone.

In accordance with yet another embodiment of the present disclosure, a method for analyzing a sample of a bodily fluid is provided, the method comprising transporting the sample of the bodily fluid by using the method recited above, wherein the method further comprises conducting an analysis of the sample of the bodily fluid by using the test strip and at least one analysis device of the measuring device.

These and other features and advantages of the embodiments of the present disclosure will be more fully understood from the following description in combination with the drawings and the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIG. 4A shows a further embodiment of a test system for analyzing a sample of a bodily fluid in a perspective view;

FIG. 4B shows the embodiment according to FIG. 4A in a cross-sectional view.

Figure 1:
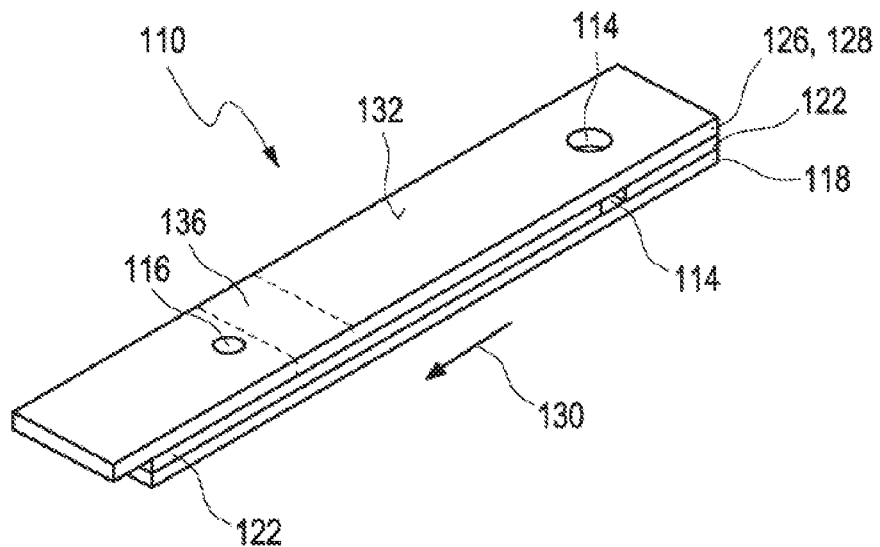
FIGS. 1A to 1B show a perspective view of a test strip which may be used in a test system according to an embodiment of the present disclosure.
Figure 1:
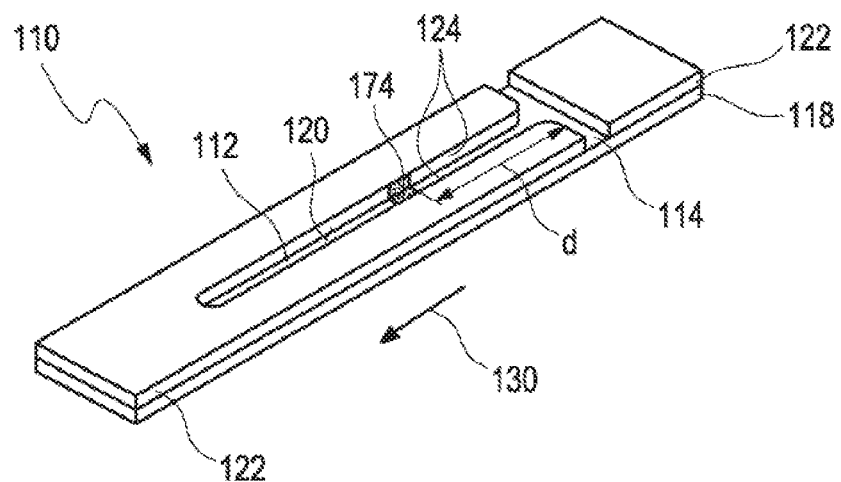

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically", "typically", "more typically", or similar terms are used in conjunction with optional features, without restricting alternative possibilities. Thus, features introduced by these terms are optional features and are not intended to restrict the scope of the claims in any way. The embodiments of the disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in such way with other optional or non-optional features of the disclosure.

As further used herein, the term "bodily fluid" may be a fluid which is present in a body tissue of a patient, such as in the interstitial tissue. Thus, as an example, the bodily fluid may be selected from the group consisting of blood and interstitial fluid. However, additionally or alternatively, one or more other types of bodily fluids may be used.

As generally used within the present disclosure, the term "patient" may refer to a human being or an animal, independent from the fact that the human being or animal, respectively, may be in a healthy condition or may suffer from one or more diseases. As an example, the patient may be a human being or an animal suffering from diabetes. However, additionally or alternatively, an embodiment of the disclosure may be applied to other types of users or patients.

The term "analyte" may refer to an arbitrary element, component or compound which may be present in a bodily fluid and the concentration of which may be of interest for a user or a patient. Typically, the analyte may be or may comprise an arbitrary chemical substance or chemical compound which may take part in the metabolism of the patient, such as at least one metabolite. As an example, the at least one analyte may be selected from the group consisting of glucose, cholesterol, triglycerides, lactate. Additionally, or alternatively, however, other types of analytes may be used and/or any combination of analytes may be determined.

The test system for analyzing a sample of a bodily fluid in accordance with an embodiment of the disclosure comprises at least one test strip comprising at least one capillary channel and at least one measuring device configured for interacting with the test strip. The capillary channel comprises an inlet opening configured to receive the sample of the bodily fluid, a vent opening configured to provide an air vent to the capillary channel and at least one zone selected from the group consisting of a detection zone and a reagent zone. The measuring device comprises at least one sealing element for hermetically sealing the vent opening of the test strip from an ambient atmosphere and at least one suction device adapted to provide an underpressure to the vent opening. Further, the measuring device comprises at least one valve or may be connected to the at least one valve. The valve is configured to optionally vent the vent opening of the test strip when the measuring device interacts with the test strip.

As used herein, the term "test strip" refers to an arbitrary device which is capable of detecting the analyte in the bodily fluid. The test strip may in particular be a strip-shaped test element. As used herein, the term "strip-shaped" refers to an element having an elongated shape and a thickness, wherein an extension of the element in a lateral dimension exceeds the thickness of the element, such as by at least a factor of 2, typically by at least a factor of 5, more typically by at least a factor of 10 and most typically by at least a factor of 20 or even at least a factor of 30. Specifically, the test strip may be fully or partially made of at least one flexible or deformable material such as at least one foil or tape. Thus, as an example, the test strip may fully or partially be made of one or more plastic foils, plastic tapes, paper, one or more ceramic sheets or arbitrary combinations thereof.

As used herein, the term "capillary channel" refers to an element which is adapted to receive the sample of the bodily fluid and/or transport the sample of the bodily fluid by capillary forces. Capillary forces can be defined as the ascension of liquids through a slim tube, a cylinder or a permeable substance due to adhesive and cohesive forces interacting between a liquid and a surface. The capillary channel may have an elongated shape extending along a longitudinal axis, wherein the capillary at least partially extends along the longitudinal axis of the test element. The term "at least partially extending along the longitudinal axis" refers to embodiments wherein the capillary may fully extend along the longitudinal axis and/or embodiments wherein parts of the capillary may not extend along the longitudinal axis. The capillary channel may further have a width and a height. The term "width" refers to a maximum extension perpendicular to an elongated test strip direction. Thereby, the width may exceed the height of the element, such as by at least a factor of 3, typically by at least a factor of 5 and more typically by at least a factor of 7.5. As an example, the capillary channel may have a width/height ratio of 1:1-10:1, such as 2:1-8:1. However, other dimensions and ratios are feasible. As an example, the width may be in the range of 500 µm or less, such as 300 µm or less or even 200 µm or less, such as in the range of 100 µm to 500 µm, e.g., in the range of 150 µm to 400 µm, e.g., 350 µm. The height may be in the range of 50 µm to 500 µm, e.g., in the range of 100 µm to 300 µm or 150 µm to 200 µm, e.g., 175 to 200 µm. These dimensions generally provide the advantage of cross-sections which are suitable for capillary transport, as opposed to wider dimensions. Further, these dimensions allow for very small sample volumes, such as the use of sample volumes in the range of significantly less than 1 mL, e.g., 500 µL or less, 300 µL or less or even 200 µL or less. Still, other dimensions are feasible.

The cross-section of the capillary channel specifically may be uniform over the whole capillary channel or over at least a part thereof. Thus, as an example, the capillary channel may have a uniform cross-section from the inlet opening mentioned in further detail below to the detection zone and/or reagent zone as also mentioned in further detail below. Exceptions from uniformity, however, may occur in the region of an inlet opening, which specifically may comprise a widening of the capillary channel, such as a funnel-type widening of the capillary channel. Further, additionally or alternatively, in the detection zone and/or reagent zone, a deviation from a uniform cross-section may occur, such as by rendering the detection zone and/or reagent zone wider than the remaining capillary channel, thereby creating a detection chamber and/or a reagent chamber. Still, other embodiments are feasible. A further zone with an extended cross-section may be present between the detection or reagent zone and the vent opening. The further zone may serve as a reservoir and may be configured to receive an excess of the sample. Thus, the further zone may be configured to prevent at least to a large extent that the sample may be sucked into the measuring device via the vent opening.

The capillary channel generally may have an arbitrary cross-section, such as a rectangular cross-section and/or a rounded cross-section and/or a polygonal cross-section. In a layer setup of a test strip, comprising a plurality of layers such as at least one base layer, at least one spacer layer and at least one cover layer, a rectangular cross-section is well-suited and easily producible. However, other types of cross-sections may be applied alternatively.

The test strip, specifically, may have precisely one capillary channel, which, specifically, may be a straight capillary channel. Thus, as an example, the at least one capillary channel comprised by the test strip may be a single, straight capillary channel. This embodiment is easily producible and avoids the disadvantages of a stop or slowing down of the capillary flow by curves or bends or turnings of the capillary channel. However, other embodiments are generally feasible.

Further, the capillary channel may have a length of 3 mm to 100 mm, such as a length of 5 mm to 50 mm, e.g., a length of 7 mm to 40 mm. These dimensions may easily be suited for transporting liquids of small amounts from the inlet opening mentioned in further detail below to the detection zone and/or reagent zone, as also mentioned in further detail below, by capillary forces and/or by a combination of capillary forces and suction. Still, other dimensions of the capillary channel are generally feasible.

The capillary channel further comprises an inlet opening configured to receive the sample of bodily fluid and a vent opening configured to provide an air vent to the capillary channel. In general, the openings may have an arbitrary shape, e.g., a rectangular shape or a round shape. Commonly, the inlet opening and/or the vent opening may be arranged on a front edge or a side edge of the test strip. As used herein, the term "side edge" refers to a position on an elongated edge of the test strip. The inlet opening and the vent opening, as an example, may be located at opposing ends of the capillary channel. Still, other embodiments are feasible. Thus, as an example, the capillary channel may extend beyond the inlet opening and/or the vent opening.

The capillary channel further comprises at least one zone selected from the group consisting of a detection zone and a reagent zone. The term "zone" refers to an arbitrary region the capillary channel. The reagent zone may comprise at least one test chemistry, also referred to as at least one test chemical. The term "test chemistry" or "test chemical" refers to an arbitrary material or a composition of materials adapted to change at least one detectable property in the presence of the at least one analyte. Generally, this property may be selected from an electrochemically detectable property and/or an optically detectable property, such as a color change and/or a change in remissive properties. Specifically, the at least one test chemistry may be a highly selective test chemistry, which only changes the property if the analyte is present in a sample of a bodily fluid applied to the test strip, whereas no change occurs if the analyte is not present. More typically, the degree or change of the at least one property is dependent on the concentration of the analyte in the bodily fluid, in order to allow for a quantitative detection of the analyte. As an example, the test chemistry may comprise at least one enzyme, such as glucose oxidase and/or glucose dehydrogenase. Additionally, or alternatively, the test chemistry may comprise one or more co-enzymes and/or one or more mediators. Further, alternatively or additionally, the test chemistry may comprise one or more dyes, which, typically in interaction with the one or more enzymes, may change their color in the presence of the at least one analyte to be detected. For exemplary embodiments of the test chemistry, reference may be made to J. Hönes et al.: Diabetes Technology and Therapeutics, Vol. 10, Supplement 1, 2008, S-10 to S-26. Still, other embodiments are feasible, generally depending on the specific type of analysis to be performed.

As used herein, the term "detection zone", often also referred to as a measurement zone, refers to a region within the capillary channel where a detection of the analyte occurs. The detection may be analyte specific. The detection may be a qualitative and/or a quantitative detection and may further be electrochemical and/or optical. The term "electrochemical detection" refers to a direct or indirect (e.g., by using electrochemical mediators) detection of an electrochemically detectable property of the analyte, such as an electrochemical detection reaction. The term "optical detection" refers to a detection of an optical detectable property of the analyte itself or an auxiliary compound which is produced or converted within a detection reaction depending on the presence and/or concentration of the analyte in the sample, such as a color change and/or a change in remissive properties.

The test system further comprises at least one measuring device configured for interacting with the test strip. As used herein, the term "measuring device", often also referred to as a measurement device, an analytical device, a meter or a test device, generally refers to an arbitrary device, typically an electronic device, which may be handled independently from the test strip and which is adapted to interact with the test strip in order to perform an analysis, such as by detecting at least one signal. The signal may be an optical signal and/or an electrochemical signal. The measurement device may further be adapted to derive at least one item of information regarding the presence and/or concentration of the analyte in the bodily fluid from the detection. Thus, the measuring device may comprise at least one electronic evaluation device in order to derive the at least one information and/or concentration of the at least one analyte from the at least one signal.

The measuring device comprises at least one sealing element and at least one suction device. The sealing element is configured to seal the vent opening of the test strip from an ambient atmosphere hermetically when the test strip is inserted into the measuring device. As used herein, the term "ambient atmosphere" refers to the surrounding environment of the test strip, which specifically may be a gaseous medium such as air under normal conditions. The term "hermetically" refers to a leak-proof tightness, such as down to pressures of 500 mbar or less, e.g., 100 mbar or less or even 10 mbar or less. Consequently, the sealing element may shield the portion of the test strip comprising the vent opening from an ambient atmosphere, prevent leakage and/or exclude contamination. The sealing element may be an arbitrary element, typically a sealing ring, more typically an o-ring with a round cross-section designed to be compressed during attachment of the sealing element to the vent opening of the test strip. The sealing element may be reversibly combinable with the vent opening. Further, the sealing element may be a connecting piece configured to reversibly connect the suction device to the vent opening of the test strip.

As used herein, the term "suction device" refers to an arbitrary element or a device configured to fully or partially evacuate a room or space, such as by fully or partially removing gas from a sealed volume and/or generating an underpressure, e.g., compared to the ambient atmosphere, within a sealed volume. The suction device may be or may comprise at least one pump. As an example, the at least one suction device may comprise at least one pump selected from the group consisting of a piston pump or a membrane pump. Still, other pumps may be used additionally or alternatively. An underpressure may be generated by allowing or forcing gas to flow from the sealed volume to the ambient atmosphere and/or to another room or chamber. In particular, the positive displacement pump may be or may comprise a membrane pump. However, other embodiments are feasible. The term "underpressure" refers to a pressure below normal pressure, i.e., a pressure below 1030 mbar, such as to a pressure of below 800 mbar, below 500 mbar, below 200 mbar or even less. Specifically, the suction device may be configured to provide a pressure gradient between the sealed volume and the ambient atmosphere, wherein the value of the pressure within the sealed volume may be smaller than the value of the pressure of the ambient atmosphere.

The measuring device may comprise at least one test strip receptacle adapted to fully or partially receive the test strip. The test strip receptacle specifically may be adapted to reversibly receive the at least one test strip. The at least one test strip may be inserted into the test strip receptacle from outside the measuring device. Additionally, or alternatively, the at least one test strip may be inserted into the test strip receptacle from inside the measuring device, such as from one or more test strip magazines. The term "test strip receptacle" generally may refer to an arbitrary element, device or space which is configured to receive and hold the at least one test strip. The test strip receptacle specifically may be embodied to hold the test strip in at least one predetermined position, such as by using at least one holding element such as at least one spring element or the like. Further, the test strip receptacle may be configured to form a counter-bearing for the inserted test strip when the sealing element of the measuring device is pressed onto the inserted test strip. The counter-bearing may be configured to mechanically support the test strip when the sealing element attaches to the test strip. The test strip receptacle may have an elongated shape extending along a longitudinal axis. Thus, the test strip receptacle may provide an elongated channel or opening having a cross-section which corresponds to the cross-section of the test strip and into which the test strip may be inserted. Other embodiments are feasible. Inside the test strip receptacle, as will be explained in further detail below, one or more interfaces may be provided for electrically and/or optically contacting the test strip. The interfaces may exemplarily be or may comprise one or more ports. Additionally, or alternatively, other kinds of interfaces may be feasible, e.g., interfaces which do not necessarily require a physical contact with the test strip, such as one or more optical interfaces.

Further, the measuring device may comprise at least one interface adapted for one or both of electrically contacting or optically contacting the test strip when inserted into the test strip receptacle. Therein, as discussed above, an optical contacting not necessarily requires a physical contact to the test strip but simply an incoupling and/or outcoupling of light into the test strip or out of the test strip, respectively. The test strip receptacle may be embodied such that the test strip, when received in the test strip receptacle, is partially located outside a housing of the measuring device and partially inside the housing of the measuring device. The term "housing" may refer to an element which is adapted to surround elements of the measuring device at least partially or even completely and configured to shield the elements from external influences like moisture or mechanical stress. The inlet opening of the test strip may be integrated into the housing. Further, when a test strip is inserted through the inlet opening into the test strip receptacle within the measuring device, the test strip may extend from outside the housing through the inlet opening of the housing into an interior of the housing. Further, with the test strip inserted into the test strip receptacle, the capillary channel may extend from outside the housing into an interior of the housing.

As used herein, a "valve" is a device that regulates, directs or controls a flow of a gas by opening, closing or partially obstructing various passageways. In an open valve, gas flows in a direction from higher pressure to lower pressure. The valve may comprise a three-way valve. Thereby, the vent opening may alternatively be connected to the suction device or to a vent port specifically to a vent port open to the ambient atmosphere.

As described above, the valve is configured to optionally vent the vent opening of the test strip when the measuring device interacts with the test strip. The term "interacting" may refer to an arbitrary process between two or more objects or components of one or more objects for a purpose of fulfilling a desired function. Specifically, the measuring device may be configured for interacting with the test strip in order to control a transport of the sample of bodily fluid within the test strip, specifically within the capillary channel of the test strip. Further, the measuring device may be configured for interacting with the test strip in order to analyze the sample of the bodily fluid. Therefore, the measuring device may be configured to get in contact with the test strip. Specifically, the test strip may be configured to be partially inserted into the measuring device. Exemplarily, the test strip may be configured to be at least partially received in the test strip receptacle of the measuring device as described above or as will further be described below in more detail. The valve may be configured to optionally vent the vent opening of the test strip when the test strip is inserted in the measuring device. Specifically, the valve may be configured to optionally vent the vent opening of the test strip when the test strip is at least partially received in the at least one test strip receptacle of the measuring device, specifically when the test strip has received its end position in the test strip receptacle. The valve may be configured to interact with the test strip via the vent opening of the test strip. Specifically, the valve may be located behind the vent opening of the test strip. Thereby, the valve may be located outside of the test strip, specifically outside of the capillary channel and the valve may be connected, specifically directly connected, to the vent opening of the test strip. The term "directly connected" may refer to an arbitrary arrangement of two or more elements wherein the two or more elements are located relative to each other such that no further objects, specifically no further functional objects are arranged between the two or more elements. Further, the valve may be configured to optionally vent the vent opening of the test strip after the test strip is connected to the measuring device or during the insertion of the test strip into the measuring device. Exemplarily, the measuring device may comprise at least one suction spout as will further be described below in more detail and the valve may be configured to optionally vent the vent opening of the test strip after the test strip is connected to the measuring device via the suction spout. Further, exemplarily, the measuring device may comprise at least one housing which provides a circumferential seal around the test strip as will further be described below in more detail and the valve may be configured to optionally vent the vent opening of the test strip after the test strip is connected to the measuring device while being at least partially received in the housing.

As further used herein, the term "optionally" may refer to a property of an arbitrary procedure of a device of being realized as an alternative of two or more different embodiments. Thus, the procedure exemplarily may be realized either as a first embodiment or as a second embodiment. However, also further embodiments such as a third embodiment or a fourth embodiment may be feasible. The term "optionally" may consequently also be referred to as "alternatively" or "electively". Specifically, the valve may have or may comprise at least one locking piece which may be moveable into at least two different positions. In a first position, the locking piece may be arranged within the valve such that a connection between the suction device and the vent opening of the test strip emerges. Further, in a second position, the locking piece may be arranged within the valve such that the suction device and the vent opening of the test strip are disconnected from each other. Instead, the vent opening of the test strip may be connected to the vent port. Specifically, the valve may be or may comprise a three-way valve and the vent opening of the test strip may alternatively be connected to the suction device or to the vent port. Thus, the term "optionally venting the vent opening" may refer to one of two or more procedures of the valve when the vent opening of the test strip is connected to the vent port. Alternatively, the valve may be configured to connect the vent opening of the test strip to the suction device. Specifically, the term "optionally venting the vent opening" may refer to a reversible procedure which is repeatable any number of times while conducting the method for controlling a transport of a sample of bodily fluid, as will further be described below in more detail.

The valve as described above or as will further be described below in more detail may provide many advantages. Specifically, a different usage of capillary effects and sub-pressure effects for transporting the sample of bodily fluid and/or for controlling the flow of the sample of bodily fluid may be feasible. Exemplarily, the suction spout may be placed on the test strip, specifically on the vent opening of the test strip, while the valve is in an open position, e.g., the vent opening of the test strip is connected to the ambient atmosphere via the vent port, without pressure fluctuations or at least with reduced pressure fluctuations within the capillary channel. Otherwise, exemplarily in case the suction spout is placed on the vent opening after the sample of bodily fluid is applied to the inlet opening and is flown within the capillary channel by capillary force such as by support of the hydrophilic section, the sample of bodily fluid would be at least partially pressed out of the capillary channel through the inlet opening. Thus, the valve may be configured to enable a filling of the capillary channel with the sample of the bodily fluid by using capillary forces. A method for controlling a transport of a sample of bodily fluid may comprise an opening of the valve, e.g., an exposure of the vent opening of the test strip to the ambient atmosphere, and a sample volume may flow through the capillary channel by capillary force, specifically through a hydrophilic section of the capillary channel which may be located at a beginning of the capillary channel, e.g., near the inlet opening of the test strip. Thereafter, the valve may be closed, e.g., the vent opening of the test strip may be connected to the suction device which provides an underpressure, and the sample of bodily fluid may flow to the zone such as to the detection zone. Consequently, the valve may be configured to support a flow of the sample of bodily fluid such that the sample of bodily fluid reaches the zone. Alternatively, the valve may be closed, e.g., the vent opening of the test strip may be connected to the suction device, but no pressure may be provided by the suction device. This may result in a reduction or a complete stop of the flow of the sample of bodily fluid in the capillary channel. Alternatively, the valve may be closed, e.g., the vent opening of the test strip may be connected to the suction device, but an overpressure may be provided by the suction device. This may result in a reversal of the flow of the sample of bodily fluid in the capillary channel.

The sealing element may comprise the at least one suction spout. The suction spout may be made of an elastic material, a partially elastic material or a rigid material. The term "suction spout" may refer to an arbitrary element which is adapted to transfer an underpressure from a first point to a second point remote from the first point. Thus, as an example, the suction spout may comprise a suction channel having at least one first opening and at least one second opening remote from the first opening. The suction spout may be or may comprise at least one hollow member having a wall and an interior lumen or suction channel. For example, the suction spout may have a tubular shape. The suction spout may have an elongated shape and an outer diameter, wherein an extension of the element in a lateral dimension may exceed the outer diameter, such as by at least a factor of 1.5, typically by at least a factor of 2, more typically by at least a factor of 3. However, other dimensions of the suction spout are feasible. The suction spout specifically may have a wall which may fully or partially be made of a flexible or deformable material. Specifically, the suction spout may fully be made of an elastic, a flexible or a deformable material such as an elastomeric material. Thereby, the suction spout may specifically only be fully made of the flexible material or of the deformable material as long as the flexible material or deformable material is configured to withstand an underpressure. Otherwise, the walls of the suction spout might collapse and seal a lumen or interior volume of the suction spout, specifically such that no underpressure reaches the other end of the suction spout. Additionally, or alternatively, only a part of the suction spout may be made of an elastic, a flexible or a deformable material, such as a ring or mouth which may contact the at least one vent opening. The suction spout, such as a suction channel of the suction spout, may further have an arbitrary cross-section, such as a rectangular cross-section and/or a rounded cross-section and/or a polygonal cross-section. However, other types of cross-sections may be applied alternatively. Further, the suction spout may be part of the sealing element and may be configured to fully or partially surround the vent opening and to seal the vent opening from the ambient atmosphere. The suction spout may also be configured to reversibly connect the vent opening of the capillary channel to the suction device. The suction spout may further be configured to enable a transport of gas from the interior of the capillary channel to the ambient atmosphere and/or to another room or chamber within the measuring device.

Further, the suction spout may comprise at least one sensor. The sensor may specifically be configured to detect that the sample almost which has been transported through the capillary channel has reached the vent opening. Further, the sensor may be configured to release at least one signal which leads to a stop of a suction of the sample in order to prevent at least to a large extent that the sample enters the suction spout and pollutes the suction spout, specifically as a cleaning would be time-consuming and elaborate. Specifically, the sensor may be located at an end of the suction spout facing the test strip. Exemplarily, the sensor may be or may comprise an optical sensor which can be configured to detect a presence of the sample near the vent opening. Further, exemplarily, additionally or alternatively, the sensor may be or may comprise a conductivity sensor. The conductivity sensor may be embodied as a pin which protrudes from the suction spout into the vent opening. Thereby, the conductivity sensor may be configured to respond to a wetting of at least one surface of the conductivity sensor with the sample. Still, other embodiments of the conductivity sensor are feasible.

Moreover, the suction spout may comprise the at least one valve as described above or as will further be described below in more detail. The valve may be configured to optionally vent the vent opening when the suction spout is connected to the vent opening and may further be configured to vent the interior of the suction spout. The suction spout may show the advantage that a movement of the sample may be stoppable precisely and rapidly, specifically though a venting and pressure compensation of the suction spout. A further movement of the sample after stopping the suction device may be completely or at least to a large extent prevented by such a coordinated venting of the suction spout. Alternatively, the further movement of the sample may be completely or at least to a large extent prevented by application of a respective counteracting pressure by the suction device.

The sealing element may comprise at least one housing configured to surround the vent opening of the capillary channel. The housing specifically may be a housing which hermetically seals an interior space of the housing. Consequently, the housing may optionally also be referred to as a "hermetic housing". As used herein, the term "hermetically" refers to a leak-proof tightness, at least in case of pressures down to 800 mbar, down to 500 mbar or even down to 300 mbar are applied.

The housing may be part of or identical to the housing of the measuring device. The measuring device and/or the housing may comprise an interior space into which at least the portion of the test strip comprising the vent opening is receivable. The test strip receptacle of the measuring device may be located in the interior space. Further, the housing may comprise a test strip slot through which the test strip may be partially introduced into the housing. Thereby, the housing may provide a circumferential seal around the test strip at the test strip slot such that an interior of the housing is sealed against the ambient atmosphere.

The housing may comprise the at least one valve or may be connected to the at least one valve as described above or as will further be described below in more detail. Specifically, the valve may be functionally equivalent to the valve for the suction spout as described above or as will further be described below in more detail. Specifically, the valve may be configured to optionally vent the vent opening of the test strip when the test strip is at least partially introduced into the housing. The housing may be configured to surround a first part of the test strip comprising the vent opening and a second part of the test strip comprising the inlet opening may be located outside of the housing. Consequently, the test strip may be configured to be introduced into the housing such that the vent opening is exposed to the interior space of the housing. The valve may be the three-way valve as described above or as will further be described below in more detail and the interior space of the housing may alternatively be connected to a vent port or to the suction device. Thereby, the vent port may be open to the ambient atmosphere. Thus, the valve may be configured to vent the interior space of the housing. The vent opening may therefore be either exposed to the ambient atmosphere or connected to the suction device. The suction device may be configured to apply an underpressure to the interior volume and thus also to the vent opening. Alternatively, the valve may be the two-way valve which is located between the interior space of the housing and the vent port and which may be alternatively opened or closed. In an open state, the interior space of the housing may be connected to the vent port and thereby the interior space of the housing may be exposed to the ambient atmosphere. In a closed state, the interior space of the housing may not be connected to the vent port and thereby the interior space of the housing may be insulated from the ambient atmosphere. In the closed state, an underpressure may be applied by the suction device to the interior space and thus also to the vent opening of the test strip.

The test strip specifically may be selected from the group consisting of an electrochemical test strip and an optical test strip. Further, the test system may comprise a test strip which combines both electrochemical and optical detection technologies. The capillary channel of the test strip may be formed by at least one base layer of the test strip, at least one spacer layer of the test strip, and at least one cover layer. Thereby, the base layer may form a bottom of the capillary channel, the spacer layer may form side walls of the capillary channel and the cover layer may form a top of the capillary channel. The capillary channel may further comprise at least one hydrophilic section and/or at least one hydrophobic section configured to control a movement of the sample of bodily fluid. The hydrophilic section and/or the hydrophobic section may comprise at least one coating selected from the group consisting of a hydrophilic coating and a hydrophobic coating. In addition, or as an alternative to a hydrophilic coating and/or a hydrophobic coating, walls of the capillary channel may directly be modified, such as by a surface treatment, e.g., by plasma treatment and/or other ways of generating hydrophilic and/or hydrophobic surfaces. The capillary channel may comprise at least one hydrophobic section spaced apart from the inlet opening. Thereby, the hydrophobic section may be adapted to stop a flow of the bodily fluid and the measuring device may be adapted to overcome the stop of the flow of the bodily fluid by applying the underpressure to the vent opening, thereby fully or partially moving the sample of the bodily fluid over the hydrophobic section. The measuring device may be adapted to allow for a movement of the sample of the bodily fluid from the inlet opening to the hydrophobic section by capillary force, without applying an underpressure. The hydrophobic section may stop the capillary flow of the sample. Consequently, the measuring device may be configured to apply the underpressure to overcome the stopping of the movement of the sample by applying the underpressure to the vent opening. Thereby, by using the combination of the capillary flow, the hydrophobic section and the application of the underpressure, a controlled flow of a small amount of a sample of the bodily fluid may take place. Consequently, a reliable analysis may be performed, with a small amount of sample such as a sample volume of 1 mL or less, typically 500 µL or less, and, still, by combining capillary flow with flow induced by underpressure or vacuum, the detection zone and/or the reagent zone may reliably be wetted with sample fluid. Exemplarily, the capillary channel may comprise a plurality of hydrophobic sections. The hydrophobic sections may be arranged in series and between the hydrophobic sections one ore more intermediate sections such as one or more reagent sections and/or one or more incubation sections and/or one or more detection sections may be located. Thus, controlled reactions, specifically controlled multistage reactions, more specifically time-defined controlled multistage reactions, may be feasible. Thereby, the test system may be configured such that the sample may be travel over one of the hydrophobic sections in a time-defined manner before a following reaction step is introduced within an intermediate section following this hydrophobic section.

Additionally, or alternatively to hydrophobic sections, also capillary valves can be used to control the movement of the sample of the bodily fluid within the capillary channel of the test strip. The term "capillary valve" may refer to one or more regions within a capillary channel comprising a sudden enlargement of the capillary channel cross-section, resulting in a stop of the capillary flow of the sample at this section caused by the sudden cross-section enlargement. Like using hydrophobic sections, also in this embodiment the stop of sample flow through the capillary channel caused by the capillary valve can be overcome by the application of an underpressure to the capillary channel using the suction spout and the suction device.

The test system may further comprise at least one sensor element for monitoring one or more of a flow, a position or a presence of the sample of bodily fluid in the capillary channel. Further, the at least one sensor element may be configured to determine the position of the sample of bodily fluid within the capillary channel, specifically in case the sample of bodily fluid does not fill the complete capillary channel but only a partial section of the capillary channel. In such embodiments, this sample of bodily fluid can be transferred to other partial sections of the capillary channel by application of an underpressure to the capillary channel using the suction spout and the suction device. The sensor element may also be referred to as a filling sensor or as a flow sensor or as a position sensor and may be adapted to interact with the test strip in order to detect least one signal. The sensor element may be configured to conduct a continuous monitoring or a point level detection. The sensor element may comprise an optical sensor and/or an electrochemical sensor. The optical sensor may be configured to detect an optical property such as a change in remissive properties. The sensor element may alternatively or complementary comprise at least one monitoring electrode. As used herein, the term "electrode" refers to an entity of the test element which is adapted to get in contact with the bodily fluid, either directly or via at least one semipermeable membrane or layer. The at least one electrode specifically may be configured to detect the presence, the position and/or a flow of the bodily fluid by using at least one conductivity measurement. Thus, the test system may be adapted to apply a voltage to at least two electrodes of the sensor element and to measure an electrical current which is influenced by the presence of bodily fluid between the at least two electrodes. Additionally, or alternatively, the test system may be adapted to apply a current to the at least two electrodes of the sensor element and to measure a voltage between the at least two electrodes, the voltage also being influenced by the presence of bodily fluid between the at least two electrodes. In both cases, the presence, the position and/or the flow of the bodily fluid may be detected by the sensor element.

Other measurements are feasible in addition or alternatively, such as impedance measurements. The at least one electrode of the sensor element may further be embodied such that an electrochemical reaction may take place at the electrode. Thus, the electrode may be embodied such that an oxidation reaction and/or reduction reaction may take place at the electrode. The sensor element may further be adapted to derive at least one item of information regarding the flow, the presence or the position of the sample of bodily fluid in the capillary channel. Thus, the sensor element may comprise at least one electronic evaluation device in order to derive at least one item of information of one or more of a flow, a presence or a position of the sample of bodily fluid in the capillary channel.

The measuring device may further comprise at least one analysis device adapted for interacting with the test strip in order to analyze the sample of the bodily fluid. Therefore, the test strip may comprise at least one test chemical adapted to perform at least one detection reaction in the presence of at least one analyte to be detected. As outlined above, the term "test chemistry" specifically may refer to an arbitrary material or a composition of materials adapted to change at least one detectable property in the presence of at least one analyte. Generally, this property may be selected from an electrically or electrochemically detectable property and/or an optically detectable property, such as a color change and/or a change in remissive properties. Specifically, the at least one test chemistry may be a highly selective test chemistry, which only changes the property of the sample of a bodily fluid if the analyte is present in a sample of a bodily fluid applied to the test strip, whereas no change occurs if the analyte is not present. More typically, the degree or change of the at least one property of the sample of a bodily fluid is dependent on the concentration of the analyte in the bodily fluid, in order to allow a quantitative detection of the analyte. As an example, the test chemistry may comprise at least one enzyme, such as glucose oxidase and/or glucose dehydrogenase. Additionally, or alternatively, the test chemistry may comprise one or more co-enzymes and/or one or more dyes, which, typically in interaction with the one or more enzymes, may change their color in the presence of the at least one analyte to be detected. The analysis device may be configured to conduct an optical measurement in order to detect at least one detection reaction. Alternatively, the analysis device may be configured to conduct an electrochemical measurement in order to detect at least one analyte contained in a sample of bodily fluid. The term "electrochemical measurement" refers to a detection of an electrochemically detectable property of the analyte itself or an auxiliary compound (e.g., a redoxmediator) which is produced or converted within a detection reaction depending on the presence and/or concentration of the analyte in the sample, such as an electrochemical detection reaction. Thus, for example, the electrochemical detection reaction may be detected by comparing one or more electrode potentials, such as an electrostatic potential of a working electrode with the electrostatic potential of one or more further electrodes such as a counter electrode or a reference electrode. The term "optical measurement" refers to a detection of an optical detectable property of the analyte itself or an auxiliary compound (e.g., a dye) which is produced or converted within a detection reaction depending on the presence and/or concentration of the analyte in the sample, such as a color change and/or a change in remissive properties. The measurement may be a qualitative and/or a quantitative measurement.

In a further aspect of the present disclosure, a method for controlling a transport of a sample of bodily fluid within a test strip and a method for analyzing at least one analyte contained in a sample of a bodily fluid are disclosed. The methods may comprise the method steps disclosed in further detail below. The method steps, as an example, may be performed in the given order. However, a different order is also feasible. Further, one or more or even all of the method steps may be performed in parallel or in a timely overlapping fashion. Further, one or more or even all of the method steps may be performed once or repeatedly. The method may further comprise one or more additional method steps.

The method for controlling a transport of a sample of bodily fluid within a test strip comprises using the test system according to the present disclosure, such as according to one or more of the embodiments disclosed above and/or according to one or more of the embodiments disclosed in further detail below. Consequently, for a description of possible embodiments and definitions of the test system, reference can be made to the description of the test system. Further the method comprises the following steps:
 a) connecting the test strip to the measuring device;
 b) connecting the vent hole to an ambient atmosphere;
 c) applying the sample of bodily fluid to the inlet opening of the capillary channel;
 d) generating an initial flow of the sample of bodily fluid by capillary force; and
 e) generating an underpressure in the capillary channel and achieving a subsequent flow of the sample of the bodily fluid, thereby transporting the sample of bodily fluid to the at least one zone selected from the group consisting of a detection zone and a reagent zone.

The vent opening may be connected to the ambient atmosphere, specifically to a vent port open to the ambient atmosphere during one or more of step a), step b), step c) and step d). Further, the vent opening may be connected to the suction device during step e). The valve of the measuring device as described above or as will further be described below in more detail, may be configured to be moved to at least one open position and to at least one closed position. In the open position, the vent opening may be connected to the ambient atmosphere and in the closed position the vent opening may be connected to the suction device. Specifically, during one or more of step a), step b), step c) and step d) the valve may be in the open position and during step e) the valve may be in the closed position.

The method may further comprise monitoring one or more of a flow, a presence or a position of the sample of the bodily fluid in the capillary channel. In a particular embodiment, the method may comprise the following step:
 f) lifting the underpressure, such as by stopping the action of the suction device and/or by opening the at least one optional valve, and, thereby, stopping the underpressure-induced flow of the sample of the bodily fluid in the capillary channel.

Specifically, step f) may be conducted by connecting the vent opening of the test strip to the ambient atmosphere such as by moving the valve to the open position.

Further, the method may further comprise a positioning of the flow of the sample of bodily fluid by one or both of opening or closing at least one valve. The sealing element may comprise at least one suction spout configured to reversibly connect the vent opening of the capillary channel to the suction device. The suction spout may comprise at least one valve for reversibly connecting the suction spout to the suction device or the ambient atmosphere. By using these additional measures, an accuracy of positioning of the flow of the sample of bodily fluid may be achieved.

In a further aspect of the present disclosure, a method for analyzing a sample of a bodily fluid is disclosed. As used herein, the term "analyzing" generally refers to determining at least one property of the sample. Specifically, the analyzing may comprise qualitatively and/or quantitatively detecting at least one analyte contained in the sample. The method, again, comprises the following steps which, as in the case of the method discussed above, may be performed in the given order, in a different order, once, repeatedly, one after the other or fully or partially simultaneously. Further method steps may be comprised. The method comprises the step of transporting the sample of the bodily fluid, wherein the method for controlling a transport of a sample of bodily fluid within a test strip according to the present disclosure is used. For potential embodiments of this method for controlling the transport, reference may be made to the description given above or the embodiments given in further detail below. The method for analyzing the bodily fluid further comprises conducting an analysis of the sample of the bodily fluid by using the test strip and at least one analysis device of the measuring device.

The proposed test system for analyzing a sample of a bodily fluid, the proposed method for controlling a transport of a sample of bodily fluid within a test strip and the proposed method for analyzing a sample of a bodily fluid provide many advantages over known devices and methods. Firstly, even though treatments are generally possible, treatments like detergent coatings to adjust the wettability of the capillary walls are no longer generally required. Consequently, indifference and instabilities are reduced as well as the production costs. Moreover, there is no limitation of the capillary length, so that various strip concepts can be realized. Further, as outlined above, only small sample volumes are required, because the capillary channel does not have to be completely filled. Consequently, a small sample portion can be moved along the capillary, such as with air on both sides of the small sample portion within the capillary channel. The fill time of the capillary may be significantly less dependent on the sample and/or test strip properties like hematocrit of the blood sample, ambient temperature or test strip age. This leads to improved measurement precision and accuracy like better homogeneity of reagent wetting and dissolving. If timely and locally controlled reactions are required, this can be now realized with low cost disposable test strips. The sample can be moved between different zones (e.g., different reagent zones, reaction zones, incubation zones, detection zones . . . ) with predefined or measurement status dependent timing including mixing options. Fill times are irrespective of the alignment of the capillary channel in a gravity field. No restrictions for meter positioning are required. Furthermore, "out of meter dosing" is possible. In case only a fast and safe filling of the capillary channel is required, instead of pressuring a special intake tubing or device onto the vent opening of the test strip, the air pressure can alternatively be actively reduced by a vacuum pump. Therefore, the vent opening of the test strip needs to be hermetically sealed from ambient atmosphere.

Further, it may be advantageous to store reactive reagents in separate sections or regions, e.g., in separate reaction zones, within the test strip to prevent at least to a large extent a contact of the reagents and thereby a reaction of the reagents with each other over time which would have an impact on a measurement result. By application of an underpressure to the capillary channel using the suction spout and the suction device, the test system may be configured such that the sample of the bodily fluid reaches the separate sections, such the one or more reagent zones and/or the one or more incubation zones and/or the one ore more detection zones, in a defined and controlled manner, specifically successively, such that multistep detection reactions may be feasible, specifically multistep detection reactions with pre-determined incubation, mixing and/or reaction times.

Further, the sensor elements may be utilized for an improved process control. Thereby, the sensor elements may be configured to detect the position of the sample of the bodily fluid within the capillary channel during conducting the multistep detection reactions. Thus, this position information may be used for further controlling the method for analyzing the sample of the bodily fluid.

Further, the test system may be configured to move the sample of bodily fluid backward and forward and thus to oscillate the sample of bodily fluid within the capillary channel. Therefore, the suction device may be configured to apply also an overpressure to the capillary channel in order to move the sample of the bodily fluid in a counter direction opposed to a general flow direction within the capillary channel. Therefore, a tight closure of the vent opening via the suction spout may be advantageous. Consequently, a certain contact pressure may be existent such that the overpressure may not escape and may reach the capillary channel.

Further, the oscillation of the sample of bodily fluid may be adjustable in terms of amplitude and frequency of the oscillation via a time-dependent control of applying the overpressure and the underpressure via the suction device. In a further embodiment, the oscillation of the sample of bodily fluid may be adjustable in terms of amplitude and frequency of the oscillation via a time-dependent control of applying an overpressure to the capillary channel via the suction device and of venting the capillary channel via a venting valve connected to the suction spout. In this embodiment, the venting of the capillary channel causes a flow the sample of the bodily within the capillary channel by capillary forces. Further, the oscillation of the sample of bodily fluid may be used to improve and/or accelerate the dissolution of a dry reagent which is located within at least one of the sections of the capillary channel by the sample of the bodily fluid. Further, a homogenization and/or mixing of the sample of the bodily fluid itself may be feasible. Thereby, sedimentation effects and/or effects due to depletion may be reduced completely or at least to a large extent. Further, the dissolution and homogenization of a reaction chemistry within the sample of the bodily fluid may be accelerated, resulting in an acceleration of the reaction process and thereby of the overall analytical detection process.

"Out of meter dosing" can be realized with the suggested device and methods. A sample is dosed onto a test strip, which is not inserted into the measuring device and which, consequently, may be inserted later into the measuring device. By capillary forces, the sample may fill a first part of a capillary, which may be hydrophilic. A hydrophobic zone may follow, which may hinder the sample to move further. Then the test strip with the sample may be inserted into the measuring device, and the measuring device may check if a sufficient amount of sample has been applied, such as by using conductivity check electrodes implemented in the first part of the capillary of the test strip. If that is the case, the measuring device may generate an underpressure in the capillary channel resulting in a subsequent flow of the sample, thereby transporting the sample further along the capillary channel into the measurement zone, where a detection reagent and detection electrodes may be placed for the conduction of the analytical test. Alternatively, or additionally, an optical analytical test may be performed in the measurement zone.

For the described idea, it may be advantageous that the liquid sample cannot leave the capillary channel of test strip inside the measuring device and, thus, may not contaminate the surrounding environment. Therefore, the vent opening generally may be designed in a way that only air and not the liquid sample can pass. Exemplarily, a hydrophobic section or a capillary valve can be located in the capillary channel near the vent opening, resulting in an interruption of the transport of the sample of the bodily fluid, at least to a large extent. Thereby, a transport of the sample of the bodily fluid into the suction device may be prevented at least to a large extent. Additionally, or alternatively, a membrane, specifically a semi-permeable membrane may be placed in front of the vent opening. Thereby, the semi-permeable membrane may be configured to let pass only gaseous mediums but not liquid mediums.

Summarizing the findings of the present disclosure, the following embodiments are typical:

Embodiment 1

A test system for analyzing a sample of a bodily fluid comprising:
at least one test strip comprising at least one capillary channel, the capillary channel comprising
an inlet opening configured to receive the sample of the bodily fluid;
a vent opening configured to provide an air vent to the capillary channel; and
at least one zone selected from the group consisting of a detection zone and a reagent zone;
at least one measuring device configured for interacting with the test strip, the measuring device comprising
at least one sealing element for hermetically sealing the vent opening of the test strip from an ambient atmosphere; and
at least one suction device adapted to provide an underpressure to the vent opening;
wherein the measuring device further comprises at least one valve or may be connected to the at least one valve, wherein the at least one valve is configured to optionally vent the vent opening of the test strip when the measuring device interacts with the test strip.

Embodiment 2

The test system according to the preceding embodiment, wherein the valve comprises a three-way valve, wherein the vent opening may alternatively be connected to a vent port or to the suction device, specifically to a vent port open to the ambient atmosphere.

Embodiment 3

The test system according to any one of the preceding embodiments, wherein the valve is configured to optionally vent the vent opening of the test strip when the test strip is inserted in the measuring device.

Embodiment 4

The test system according to the preceding embodiment, wherein the valve is configured to optionally vent the vent opening of the test strip when the test strip is at least partially received in at least one test strip receptacle of the measuring device.

Embodiment 5

The test system according to any one of the preceding embodiments, wherein the valve is configured to optionally vent the vent opening of the test strip after the test strip is connected to the measuring device.

Embodiment 6

The test system according to any one of the preceding embodiments, wherein the valve is configured to interact with the test strip via the vent opening of the test strip.

Embodiment 7

The test system according to any one of the preceding embodiments, wherein the valve is located after the vent opening of the test strip.

Embodiment 8

The test system according to any one of the preceding embodiments, wherein the sealing element comprises at least one housing configured to surround the vent opening of the capillary channel.

Embodiment 9

The test system according to the preceding embodiment, wherein the housing is a part of a housing of the measuring device.

Embodiment 10

The test system according to any one of the two preceding embodiments, wherein the measuring device comprises an interior space into which the portion of the test strip comprising the vent opening is receivable.

Embodiment 11

The test system according to the preceding embodiment, wherein the test strip receptacle of the measuring device is located in the interior space.

Embodiment 12

The test system according to any one of the four preceding embodiments, wherein the housing comprises a test strip slot through which the test strip may be partially introduced into the housing, wherein the housing provides a circumferential seal around the test strip at the test strip slot such that an interior space of the housing is sealed against the ambient atmosphere.

Embodiment 13

The test system according to the preceding embodiment, wherein the housing comprises the at least one valve or may be connected to the at least one valve, wherein the valve is configured to optionally vent the vent opening of the test strip when the test strip is at least partially introduced into the housing.

Embodiment 14

The test system according to the preceding embodiment, wherein the valve is configured to vent the interior space of the housing.

Embodiment 15

The test system according to any one of the three preceding embodiments, wherein the measuring device comprises at least one test strip receptacle adapted to fully or partially receive the test strip.

Embodiment 16

The test system according to the preceding embodiment, wherein the measuring device comprises at least one interface adapted for one or both of electrically contacting or optically contacting the test strip when inserted into the test strip receptacle.

Embodiment 17

The test system according to any one of the two preceding embodiments, wherein the test strip receptacle is embodied such that the test strip, when receiving the test strip receptacle, is partially located outside a housing of the measuring device and partially located inside a housing of the measuring device.

Embodiment 18

The test system according to the preceding embodiment, wherein the inlet opening of the test strip is located outside the housing.

Embodiment 19

The test system according to any one of the eleven preceding embodiments, wherein the housing is configured to surround a first part of the test strip, wherein a second part of the test strip is located outside of the housing, wherein the first part comprises the vent opening and wherein the second part comprises the inlet opening.

Embodiment 20

The test system according to any one of the preceding embodiments, wherein the sealing element comprises at least one suction spout configured to reversibly connect the vent opening of the capillary channel to the suction device.

Embodiment 21

The test system according to the preceding embodiment, wherein the suction spout is configured to fully or partially surround the vent opening and to seal the vent opening from the ambient atmosphere.

Embodiment 22

The test system according to any one of the two preceding embodiments, wherein the suction spout comprises the at least one valve or may be connected to the at least one valve, wherein the at least one valve is configured to optionally vent the vent opening when the suction spout is connected to the vent opening.

Embodiment 23

The test system according to any one of the two preceding embodiments, wherein the valve is configured to vent an interior of the suction spout.

Embodiment 24

The test system according to any one of the preceding embodiments, wherein the capillary channel is formed by at least one base layer of the test strip, the base layer forming a bottom of the capillary channel, at least one spacer layer of the test strip, the spacer layer forming side walls of the capillary channel, and at least one cover layer, the cover layer forming a top of the capillary channel.

Embodiment 25

The test system according to any one of the preceding embodiments, wherein the test strip is selected from at least one element of the group consisting of an electrochemical test strip, an optical test strip and a test strip combining optical and electrochemical detection methods.

Embodiment 26

The test system according to any one of the preceding embodiments, wherein the capillary channel further comprises at least one hydrophilic section and/or at least one hydrophobic section configured to control a movement of the sample of bodily fluid.

Embodiment 27

The test system according to the preceding embodiment, wherein the hydrophilic section and/or the hydrophobic section comprise at least one coating selected from the group consisting of a hydrophilic coating and a hydrophobic coating.

Embodiment 28

The test system according to any one of the two preceding embodiments, wherein the capillary channel comprises at least one hydrophobic section spaced apart from the inlet opening, wherein the hydrophobic section is adapted to stop a flow of the bodily fluid, wherein the measuring device is adapted to overcome the stop of the flow of the bodily fluid by applying the underpressure to the vent opening, thereby fully or partially moving the sample of the bodily fluid over the hydrophobic section.

Embodiment 29

The test system according to the preceding embodiment, wherein the measuring device is adapted to allow for a movement of the sample of the bodily fluid from the inlet opening to the hydrophobic section by capillary force, without applying an underpressure and, consequently, to apply the underpressure to overcome the stopping of the movement of the sample by applying the underpressure to the vent opening.

Embodiment 30

The test system according to any one of the preceding embodiments, wherein the test system further comprises at least one sensor element for monitoring one or more of a flow, a presence or a position of the sample of bodily fluid in the capillary channel.

Embodiment 31

The test system according to the preceding embodiment, wherein the sensor element for monitoring one or more of a flow, a presence or a position of the sample of bodily fluid in the capillary channel comprises an optical sensor.

Embodiment 32

The test system according to any one of the two preceding embodiments, wherein the sensor element for monitoring one or more of a flow, a presence or a position of the sample of bodily fluid in the capillary channel comprises at least one monitoring electrode.

Embodiment 33

The test system according to any one of the preceding embodiments, wherein the measuring device further comprises at least one analysis device adapted for interacting with the test strip in order to analyze the sample of the bodily fluid.

Embodiment 34

The test system according to the preceding embodiment, wherein the test strip comprises at least one test chemical adapted to perform at least one detection reaction in the presence of at least one analyte to be detected, wherein the analysis device is configured to conduct an optical measurement in order to detect at least one analyte contained in the sample of the bodily fluid.

Embodiment 35

The test system according to any one of the two preceding embodiments, wherein the analysis device is configured to conduct an electrochemical measurement in order to detect at least one analyte contained in a sample of bodily fluid.

Embodiment 36

A method for controlling a transport of a sample of bodily fluid within a test strip, the method comprising using a test system according to any one of the preceding embodiments, the method comprising the following steps:
  a) connecting the test strip to the measuring device;
  b) connecting the vent opening to an ambient atmosphere;
  c) applying the sample of bodily fluid to the inlet opening of the capillary channel;
  d) generating an initial flow of the sample of bodily fluid by capillary force; and
  e) generating an underpressure in the capillary channel and achieving a subsequent flow of the sample of the bodily fluid, thereby transporting the sample of bodily fluid to the at least one zone selected from the group consisting of a detection zone and a reagent zone.

Embodiment 37

The method according to the preceding embodiment, wherein during one or more of step a), step c) and step d) the vent opening is connected to the ambient atmosphere, specifically to a vent port open to the ambient atmosphere.

Embodiment 38

The method according to any one of the two preceding embodiments, wherein during step e) the vent opening is connected to the suction device.

Embodiment 39

The method according to any one of the three preceding embodiments, wherein the valve of the measuring device is configured to be moved to at least one open position and to at least one closed position, wherein in the open position the vent opening is connected to the ambient atmosphere and in the closed position the vent opening is connected to the suction device.

Embodiment 40

The method according to the preceding embodiment, wherein during one or more of step a), step b), step c) and step d) the valve is in the open position.

Embodiment 41

The method according to any one of the two preceding embodiments, wherein during step e) the valve is in the closed position.

Embodiment 42

The method according to any one of the six preceding embodiments, further comprising monitoring one or more of a flow, a presence or a position of the sample of the bodily fluid in the capillary channel.

Embodiment 43

The method according to any one of the seven preceding embodiments, further comprising the following step:
f) lifting the underpressure and, thereby, stopping the underpressure-induced flow of the sample of the bodily fluid in the capillary channel.

Embodiment 44

The method according to the preceding embodiment, wherein step f) is conducted by connecting the vent opening to the ambient atmosphere.

Embodiment 45

The method according to any one of the nine preceding embodiments, further comprising a positioning of the flow of the sample of bodily fluid by one or both of opening or closing the at least one valve.

Embodiment 46

The method according to the preceding embodiment, wherein the sealing element comprises at least one suction spout configured to reversibly connect the vent opening of the capillary channel to the suction device, wherein the suction spout comprises the at least one valve for reversibly connecting the suction spout to the surrounding environment.

Embodiment 47

The method according to any one of the two preceding embodiments, wherein the sealing element comprises at least one housing configured to surround the vent opening of the capillary channel, wherein the housing comprises the at least one valve for reversibly connecting the vent opening to the surrounding environment.

Embodiment 48

A method for analyzing a sample of a bodily fluid, the method comprising transporting the sample of the bodily fluid by using the method according to any one of the preceding method embodiments, the method further comprising conducting an analysis of the sample of the bodily fluid by using the test strip and at least one analysis device of the measuring device.

In order that the embodiments of the present disclosure may be more readily understood, reference is made to the following examples, which are intended to illustrate the disclosure, but not limit the scope thereof.

Within the present disclosure, various test strips having one or more capillary channels may be used. Thus, as an example, reference may be made to the test strips disclosed by U.S. Patent Application Publication No. 2005/0214171 A1, the disclosure of which is hereby incorporated by reference. Additionally, or alternatively, in FIGS. 1A and 1B, an embodiment of a test strip 110 is shown which may be used in a test system according to the present disclosure.

The test strip 110 as shown in FIGS. 1A and 1B comprises at least one capillary channel 112. The capillary channel 112 further comprises at least one inlet opening 114 configured to receive a sample of a bodily fluid. In the embodiment shown in FIGS. 1A and 1B, both a top dosing or a side dosing is possible, by using a plurality of inlet openings 114. It shall be noted, however, that other embodiments are feasible, such as embodiments allowing for front dosing, side dosing or top dosing, only, as generally known in the art.

The test strip 110 further comprises at least one vent opening 116 configured to provide an air vent to the capillary channel 112. Further, the capillary channel 112 comprises at least one zone selected from the group consisting of a detection zone 136 and a reagent zone, which will be explained in further detail below with reference to FIG. 2A.

The test strip 110 may further comprise at least one base layer 118. The base layer 118 may form a bottom 120 of the capillary channel 112. Further, the test strip 110 may comprise at least one spacer layer 122, the spacer layer 122 forming side walls 124 of the capillary channel 112. The test strip 110 may further comprise at least one cover layer 126, the cover layer 126 forming a top 128 of the capillary channel 112. However, other embodiments of the test strip 110 are feasible. FIG. 1B shows a representation of the embodiment of the test strip 110 according to FIG. 1A, wherein, in this representation, the cover layer 126 is removed, in order to provide a view onto the capillary channel 112.

The capillary channel 112 may have an elongated shape extending along a longitudinal axis 130, wherein the capillary channel 112 may fully or partially extend along the longitudinal axis 130. In this embodiment, the capillary channel 112 specifically may have a rectangular cross section. However, other types of cross sections may be applied alternatively. The test strip 110 may be capable of detecting an analyte in the bodily fluid. Thereby, the capillary channel 112 may be adapted to receive the sample of the bodily fluid and/or transport the sample of bodily fluid by capillary forces.

The at least one inlet opening 114 and the at least one vent opening 116 generally may have an arbitrary shape. In this embodiment, round and rectangular openings are shown. However, other shapes may be applied alternatively. Further, in this embodiment, the openings may be arranged on an upper surface 132 of the cover layer 126. It shall be noted, however, that one or more of openings 114, 116 may also be positioned in other ways, such as within the base layer 118 and/or within the spacer layer 122.

The inlet opening 114 is configured to receive the sample of bodily fluid, and the vent opening 116 is configured to provide an air vent to the capillary channel 112.

Figure 2:
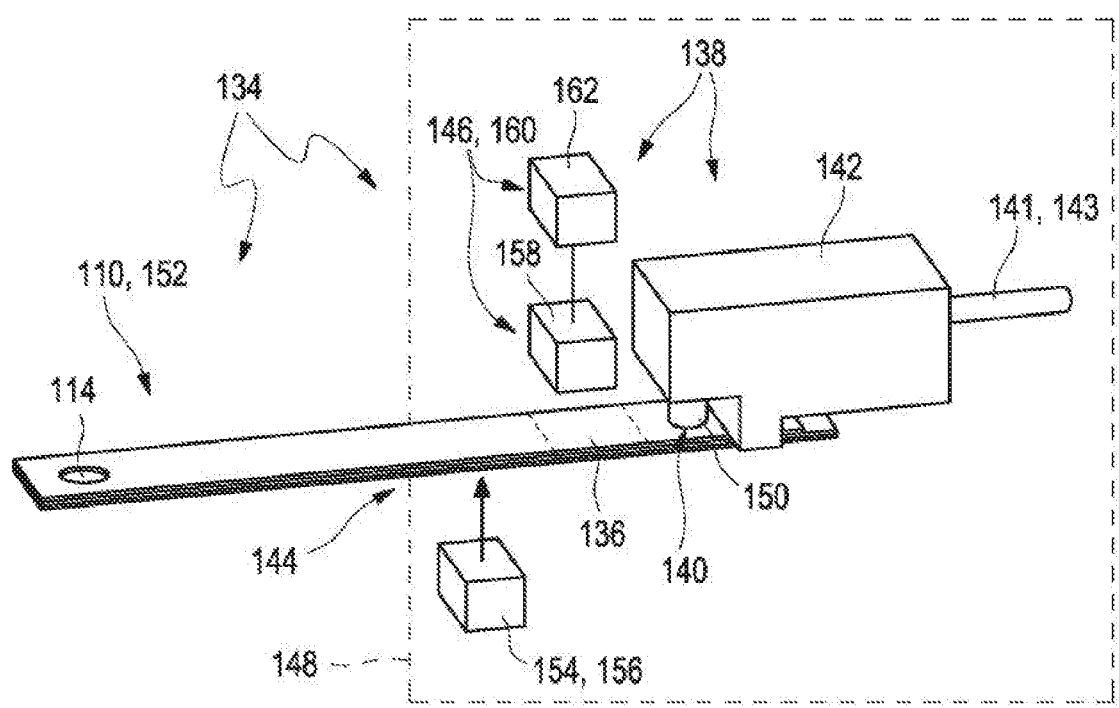
FIG. 2A shows a first exemplary embodiment of a test system for analyzing a sample of a bodily fluid in a perspective view.
FIG. 2B shows the embodiment according to FIG. 2A in a cross-sectional view.
Figure 2:
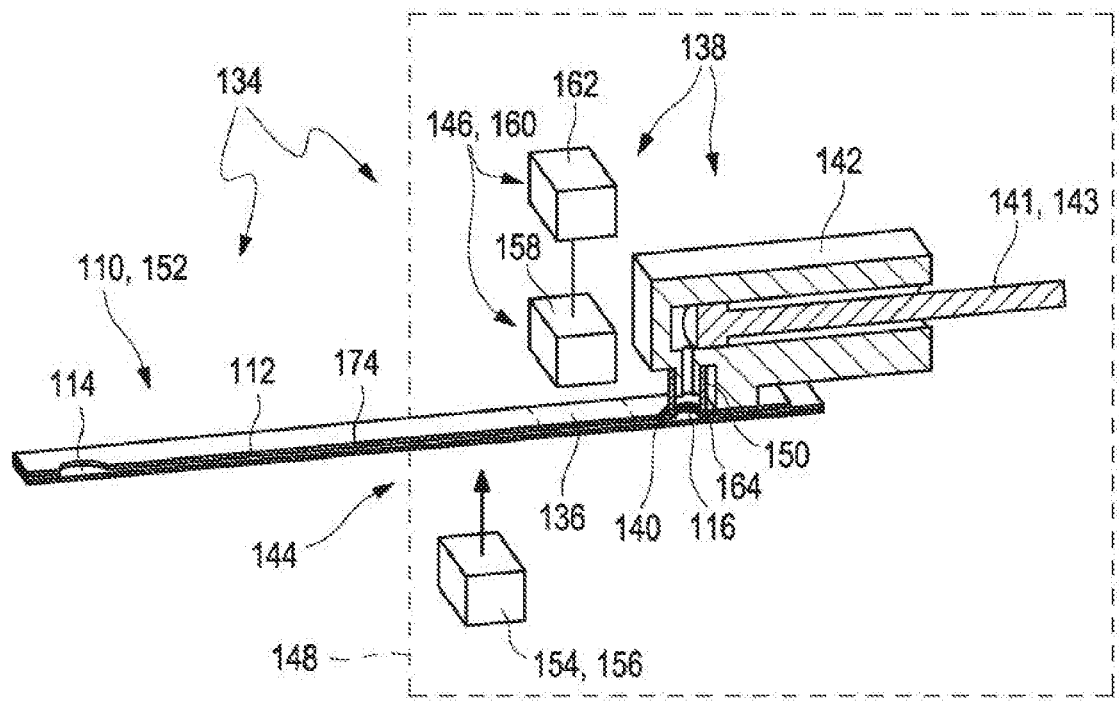

In FIGS. 2A and 2B, a first embodiment of a test system 134 for analyzing a sample of bodily fluid is shown. The test system 134 comprises at least one test strip 110. Further, the test system 134 comprises at least one measuring device 138 configured for interacting with the test strip 110.

The test strip 110 generally may be embodied as outlined above. The test strip 110, thus, may comprise at least one capillary channel 112, at least one inlet opening 114 configured to receive the sample of the bodily fluid, at least one vent opening 116 configured to provide an air vent to the capillary channel 112 and at least one zone selected from the group consisting of a detection zone 136 and a reagent zone. In this embodiment, the test strip 110 may be an optical test strip 152. For further details on the test strip 110, reference may be made to the descriptions of FIGS. 1A and 1B.

The measuring device 138 may be or may comprise an electronic device 160, which may be handled independently from the test strip 110. The measuring device 138 may be adapted to interact with the test strip 110 in order to detect at least one signal. In this embodiment, the signal may be an optical signal. The measuring device 138 may further be adapted to derive at least one item of information regarding the presence and/or concentration of at least one analyte in the bodily fluid. Consequently, the measuring device 138 may comprise at least one electronic evaluation device 162 in order to derive at least one item of information regarding the presence and/or concentration of the at least one analyte from the at least one signal. Thus, as an example, the electronic device 160 may comprise at least one interface 146 adapted for electrically contacting and/or optically interacting with the at least one test strip 110. As an example and as depicted in FIGS. 2A and 2B, the interface 146 may be or may comprise an optical interface adapted for performing at least one optical measurement by using the test strip 110. As an example, the interface 146 may be configured to perform a remission measurement on the detection zone 136. Thus, the interface 146 may comprise at least one light source adapted for generating at least one light beam and illuminating the detection zone 136, and at least one detector adapted for detecting the light reflected and/or scattered by the detection zone 136. Thereby, a color change of the detection zone 136 may be detected. Additionally, or alternatively, however, the interface 146 may also be or comprise two or more electrical contacts adapted for electrically contacting the test strip 110, such as for electrically contacting two or more measurement electrodes contained therein, such as at least one working electrode and at least one counter electrode. The design of the interface 146 generally may depend on the nature of the test strip 110, which, as an example, may be an optical test strip and/or an electrochemical test strip. The interface 146 specifically may be or may comprise at least one analysis device 158 adapted for interacting with the test strip 110, specifically with the detection zone 136, in order to analyze the sample of the bodily fluid. The analysis device 158, as outlined above, may be configured to conduct an optical measurement in order to detect at least one detection reaction. The measurement may be a qualitative and/or a quantitative measurement.

The measuring device 138 further comprises at least one sealing element 140 for hermetically sealing the vent opening 116 of the test strip 110 from an ambient atmosphere. The sealing element 140 may be or may comprise a sealing ring 164, typically an O-ring with a round cross section designed to be compressed during assembly between two or more elements. The sealing element 140 may be reversibly combinable with the vent opening 116.

Further, the measuring device 138 comprises at least one suction device 142 adapted to provide an underpressure to the vent opening 116. The at least one suction device 142 specifically may comprise at least one pump 141, such as at least one piston pump 143.

The test system 134 may further comprise at least one test strip receptacle 144 adapted to fully or partially receive the test strip 110. The test strip receptacle 144, as an example, may comprise at least one opening in at least one housing 148 fully or partially encasing the measuring device 138, which is symbolically depicted by the dashed line in FIGS. 2A and 2B. The at least one interface 146 specifically may be adapted for one or both of electrically contacting to or optically interacting with the test strip 110 when inserted into the test strip receptacle 144. The test strip receptacle 144 may be embodied such that the test strip 110, when received in the test strip receptacle 144, is partially located outside a housing 148 of the measuring device 138 and partially located inside the housing 148.

The inlet opening 114 of the test strip 110 may be located outside the housing 148 when the test strip 110 is received in the test strip receptacle 144. The sealing element 140 may comprise at least one suction spout 150 configured to reversibly connect the vent opening 116 of the capillary channel 112 to the suction device 142. The suction spout 150 may comprise the sealing element 140 and may be configured to fully or partially surround the vent opening 116 and to seal the vent opening 116 from the ambient atmosphere.

The test system 134 may further comprise at least one sensor element 154 for monitoring one or both of a flow or presence of the sample of bodily fluid and the capillary channel 112. The sensor element 154 may be configured to conduct a continuous monitoring or a point level detection. Further, the sensor element 154 may comprise an optical sensor 156. The optical sensor 156 may be configured to detect an optical property such as a change in reflective properties. Additionally, or alternatively, the sensor element 154 may comprise at least one electrical measurement device, such as at least one pair of measurement electrodes adapted to perform a conductivity measurement within the capillary channel 112, in order to electrically detect the presence and/or the flow of the sample of the bodily fluid in the capillary channel 112.

As depicted in FIG. 1B, the capillary channel 112, which generally may have hydrophilic surface properties, specifically may comprise at least one hydrophobic section 174. As an example, the hydrophobic section 174 may be located in the capillary channel 112 at a distance d from the inlet opening 114. During use, due to the generally hydrophilic surface properties of the capillary channel 112, the sample of the bodily fluid may be drawn into the capillary channel 112 by capillary forces, until the hydrophobic section 174 is reached. At this point, the flow of the sample stops, due to the hydrophobic surface properties of hydrophobic section 174. As an example, hydrophobic section 174 may be or may comprise the hydrophobic coating of one or more walls of the capillary channel 112. Subsequently, by applying an underpressure or a vacuum to the vent opening 116 by using the suction device 142 and the sealing element 140, the sample of the bodily fluid may be drawn over the hydrophobic section 174, thereby reaching the subsequent hydrophilic sections of the capillary channel and the detection zone 136 and, as an example, wetting one or more test chemicals and/or one or more detection electrodes located therein. The at least one above-mentioned sensor element 154 may be configured to detect the presence and/or the flow of the bodily fluid in the capillary channel 112 in one or more of a position between the inlet opening 114 and the at least one hydrophobic section 174, within the hydrophobic section 174, between the hydrophobic section 174 and the detection zone 136 or within the detection zone 136. Thus, as an example and as outlined above, optical measurements and/or electrical measurements for detecting the bodily fluid and/or the flow in one or more of the named positions may be performed by the at least one sensor element 154. As an example, the measuring device 158, specifically the electronic device 160, may be adapted to start a suction by using the suction device 142 only after a sufficient or complete filling of the capillary channel 112 in between the inlet opening 114 and the hydrophobic section 174 has been detected. Thus, by using the at least one hydrophobic section 174, in conjunction with capillary forces and, subsequently, suction forces externally applied by using the suction device 142, a very precise control of the amount and flow of the bodily fluid may be exerted.

Figure 3:
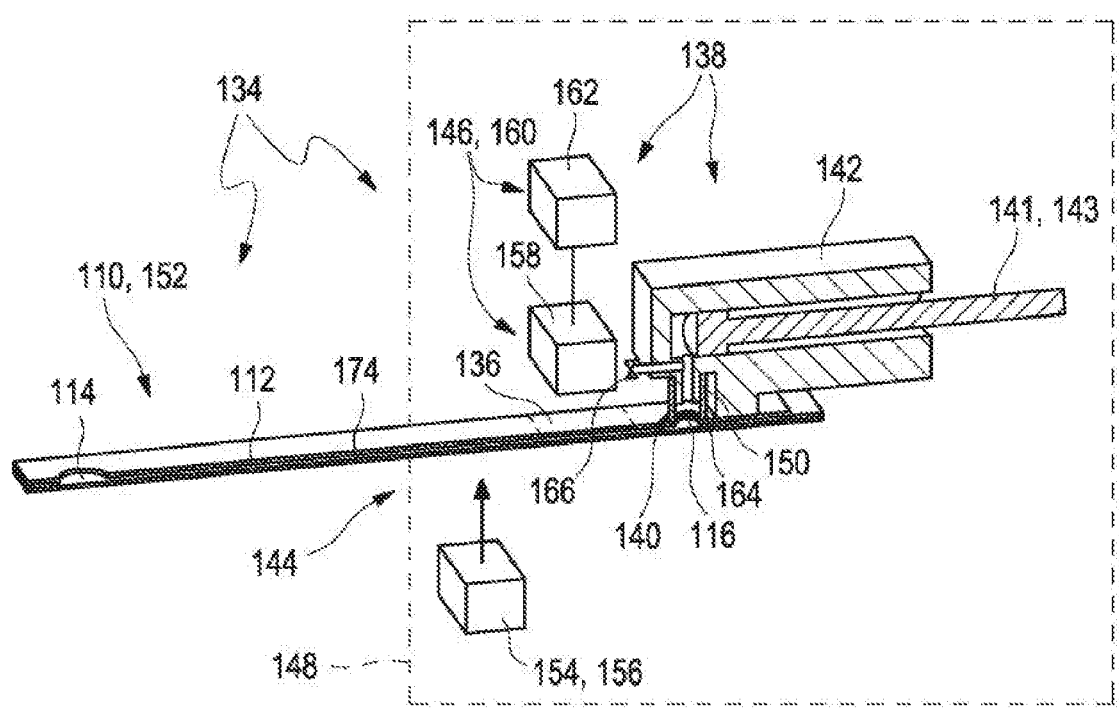
FIGS. 3A to 3B show alternative embodiments of a test system for analyzing a sample of a bodily fluid in a cross-sectional view.
Figure 3:
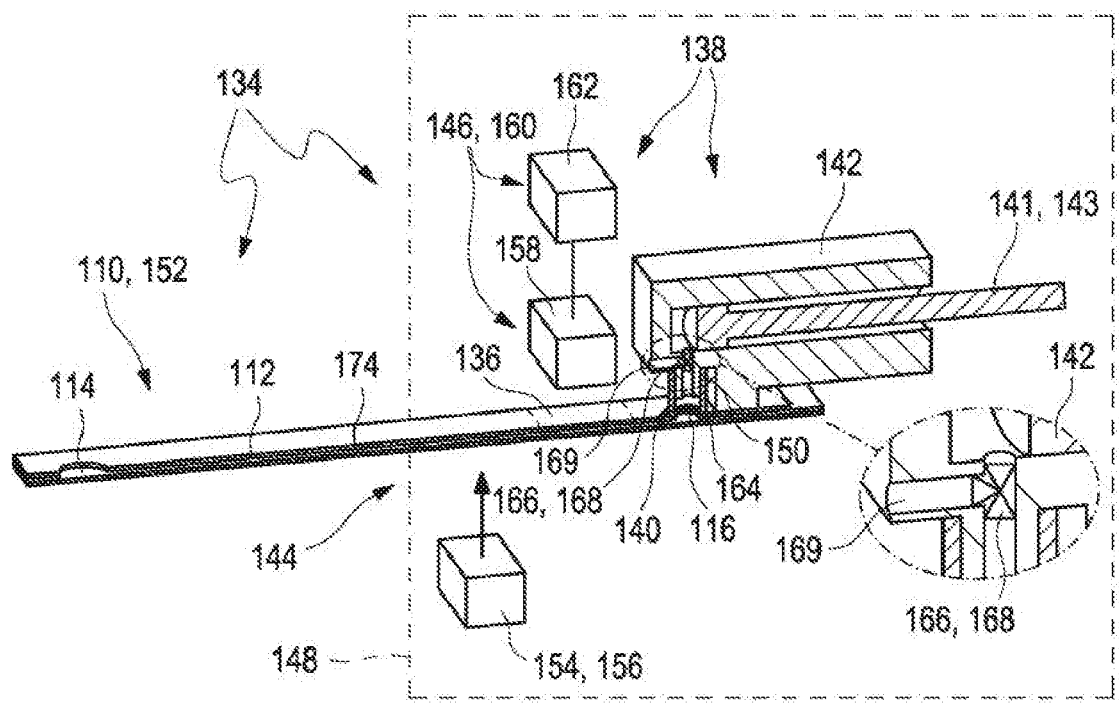

FIGS. 3A and 3B show alternative embodiments of the test system 134. The test system 134 widely corresponds to the test system as presented in FIGS. 2A and 2B, except for the modifications mentioned in further detail below. Consequently, for most parts and functions, reference may be made to the description of FIGS. 2A and 2B as given above.

As opposed to the embodiment of FIGS. 2A and 2B, however, the suction spout 150 in the embodiment of FIGS. 3A and 3B may comprise at least one valve 166 configured to optionally vent an interior of the spout 150 and, thus, the vent opening 116. As shown in FIG. 3A, the valve may simply be embodied as a closable opening or as a two-way valve. Alternatively, as shown in FIG. 3B, the valve may be or may comprise a three-way valve 168, wherein the vent opening 116 may alternatively be connected to the suction device 142 or to a vent port 169, specifically to a vent port 169 open to an ambient atmosphere. The valve 166, 168 may be configured to vent the interior of the suction spout 150. The valve 166, 168 may be a device that regulates, directs or controls a flow of a gas by opening, closing or partially obstructing various passage ways. In an open valve, gas may flow in a direction from higher pressure to lower pressure.

FIGS. 4A and 4B show further alternative embodiments of the test system 134. Therein, FIG. 4A shows a perspective view, whereas FIG. 4B shows a sectional view of the test system 134. The test system 134, again, widely corresponds to the test system 134 as presented in FIGS. 2A and 2B, except for the modifications mentioned in further detail below. Consequently, for most parts and functions, reference may be made to the description of FIGS. 2A and 2B as given above.

Again, as in FIGS. 2A and 2B, the measuring device 138 of FIGS. 4A and 4B comprises at least one sealing element 140 for hermetically sealing the vent opening 116 of the test strip 110 from an ambient atmosphere. The sealing element 140 may shield the capillary channel 112 from an ambient atmosphere, prevent leakage and/or exclude contamination. Further, by using suction device 142, an underpressure may be applied to the vent opening 116.

As opposed to the embodiment of FIGS. 2A and 2B, however, the sealing element 140, in the embodiment shown in FIGS. 4A and 4B, comprises the housing 148 of the measuring device 138. The housing 148, in this embodiment, may be embodied as a hermetic housing and may hermetically seal an interior space 170 of the housing 148. Thus, when the test strip 110 is inserted into a test strip receptacle 144, which may fully or partially be located in the interior space 170, the housing 148 may be gas-tight, and, thus, an underpressure may be applied to the interior space 170 by the suction device 142, thereby fully or partially evacuating the interior space 170. A test strip slot 172 through which the test strip 110 may be inserted into the test strip receptacle 144 inside the housing 148 may provide one or more sealing lips 176 fully or partially surrounding slot 172 and tightening a gap between the test strip 110 and the housing 148. The at least one sealing lip 176 may also form part of the hermetic housing 148 and, thus, of the sealing element 140.

Figure 5A:
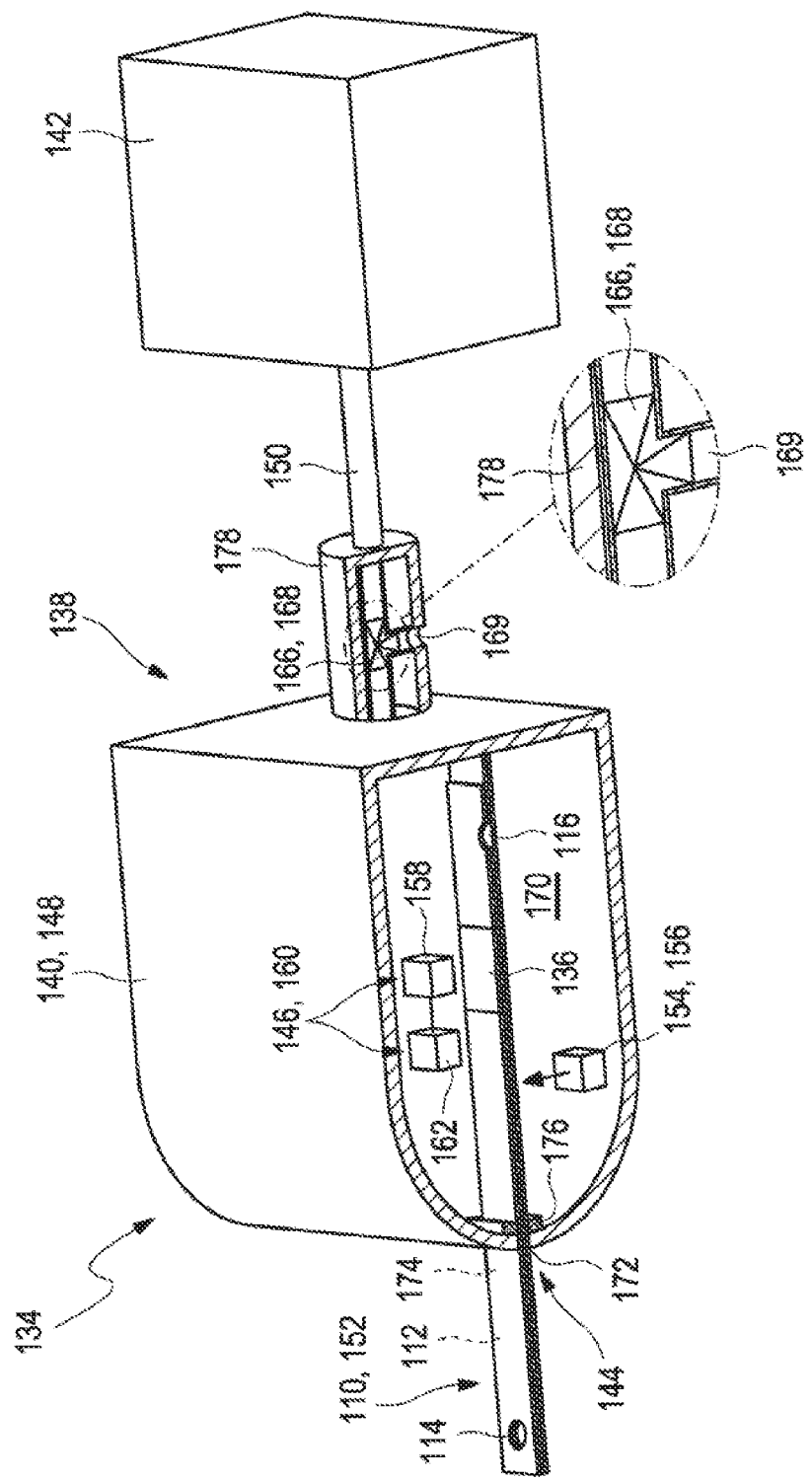
FIGS. 5A to 5B show two further embodiments of a test system for analyzing a sample of a bodily fluid in a cross-sectional view.
Figure 5:
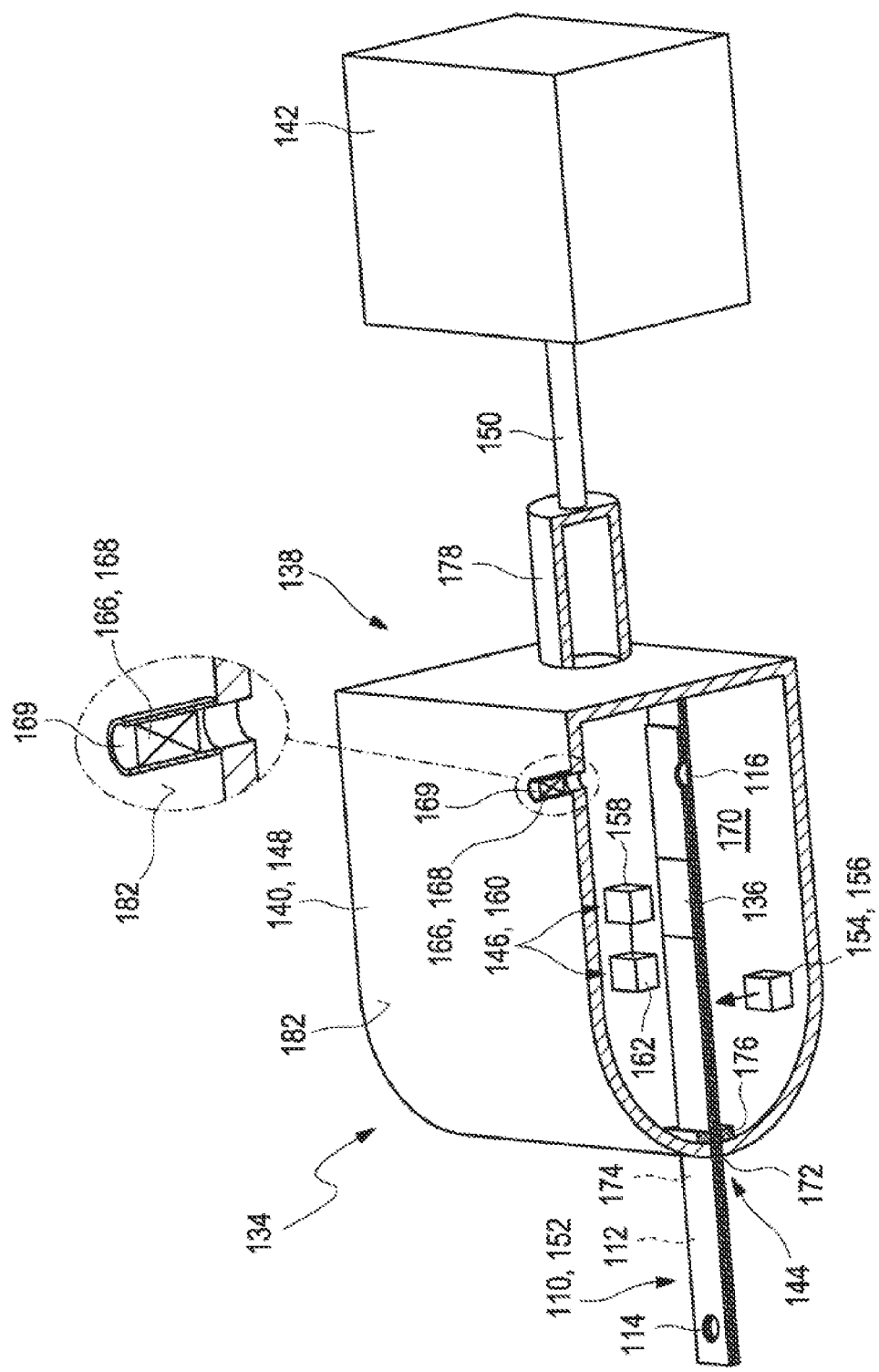

By operating the suction device 142, as outlined above, an underpressure may be applied to the interior space 170 and, thus, to the vent opening 116. The operation of the test system 134 may take place as outlined above in the context of FIGS. 2A and 2B. Thus, firstly, after applying the sample of the bodily fluid to the inlet opening 114, the sample may firstly be sucked into the capillary channel 112 by capillary action, thereby filling a part of the capillary channel 112. The flow of the bodily fluid may optionally be stopped by one or more hydrophobic zones which are not depicted in FIGS. 4A and 4B, thereby generating a well-defined volume of liquid in the capillary channel in between the inlet opening 114 and the at least one hydrophobic zone. Subsequently, such as after optionally detecting the presence and/or the flow of the bodily fluid by using the at least one optional sensor element 154, a further flow of the sample of the bodily fluid may be initiated by applying an underpressure or vacuum to the interior space 170, thereby forwarding the sample to the at least one detection zone 136, followed by an analysis by using the analysis device 158. Further, the test system 134 may comprise one or more valves which may be configured to ventilate and/or to seal the interior space 170, functionally equivalent to the valves 166, 168 for the suction spout 150 as illustrated in FIGS. 3A to 3B. Exemplary embodiments are illustrated in FIGS. 5A to 5B. Thus, for further details, reference may be made to the description of FIGS. 5A to 5B below.

FIGS. 5A and 5B show two further embodiments of a test system 134 for analyzing a sample of a bodily fluid in a cross-sectional view. The embodiments of the test system 134 as depicted in FIGS. 5A and 5B correspond at least in large parts to the test system 134 as illustrated in FIGS. 4A and 4B. Thus, reference may be made to the description of FIGS. 4A to 4B above.

In FIG. 5A, as opposed to FIGS. 4A and 4B, however, the measuring device 138 is illustrated having the at least one valve 166. The valve 166 may be located within element 178. The element 178 may be part of the housing 148 or may be embodied as a separate component which is attached to the housing 148. The element 178 may comprise the vent port 169 which may be open to the ambient atmosphere. Thus, the valve 166 may be located after the vent opening 116 of the test strip 110 and the valve 166 may be configured to optionally vent the vent opening 166 of the test strip 110 after the test strip 110 is connected to the measuring device 138 while being at least partially received in the housing 148. The valve 166 may be configured to optionally vent the vent opening 116 of the test strip 110 when the test strip 110 is at least partially introduced into the housing 158 during insertion of the test strip. Specifically, the test strip 110 may be at least partially received in the test strip receptacle 144 of the measuring device 138. Further, the valve 166 may be configured to optionally vent the vent opening 116 of the test strip 110 after the test strip 110 is connected to the measuring device 138.

Specifically, the valve 166 may be the three-way valve 168 and the interior space 170 of the housing 148 may alternatively be connected to the vent port 169 or to the suction device 142. Thereby, the vent port 169 may be open to the ambient atmosphere. The vent opening 116 of the test strip 110 may therefore be either exposed to the ambient atmosphere or connected to the suction device 142 which may be configured to apply an underpressure to the interior volume 170 and thus also to the vent opening 116 of the test strip 110.

The embodiment of the test system 134 according to FIG. 5B comprises the measuring device 138 having the at least one valve 166. The valve 166 may be a two-way valve 180. Specifically, the vent port 169 may be located on an outer surface 182 of the housing 148 and may be open to the ambient atmosphere. Thereby, the two-way valve 180 may be located between the interior space 170 of the housing 148 and the vent port 169. The interior space 170 of the housing 148 may alternatively be connected to the vent port 169. In an open state of the two-way valve 180, the interior space 170 of the housing 148 may be connected to the vent port 169 and the interior space 170 of the housing 148 may be exposed to the ambient atmosphere. In a closed state of the two-way valve 180, the interior space 170 of the housing 148 may be insulated from the ambient atmosphere. Thereby, an underpressure may be applied by the suction device 142 to the interior space 170 thus also to the vent opening 116 of the test strip 110.

LIST OF REFERENCE NUMBERS 110 test strip
112 capillary channel
114 inlet opening
116 vent opening
118 base layer
120 bottom
122 spacer layer
124 side wall
126 cover layer
128 top
130 longitudinal axis
132 upper surface
134 test system
136 detection zone
138 measuring device
140 sealing element
141 pump
142 suction device
143 piston pump
144 test strip receptacle
146 interface
148 housing
150 suction spout
152 optical test strip
154 sensor element
156 optical sensor
158 analysis device
160 electronic device
162 electronic evaluation device
164 sealing ring
166 valve
168 three-way valve
169 vent port
170 interior space
172 test strip slot
174 hydrophobic section
176 sealing lip
178 element
180 two-way valve
182 outer surface

What is claimed is:

1. A test system for analyzing a sample of a bodily fluid comprising:
    at least one test strip comprising at least one capillary channel, the capillary channel comprising
        an inlet opening configured to receive the sample of the bodily fluid;
        a vent opening configured to provide an air vent to the capillary channel; and
        at least one zone selected from the group consisting of a detection zone and a reagent zone;
    at least one measuring device configured for interacting with the test strip, the measuring device comprising
        at least one sealing element configured for hermetically sealing the vent opening of the test strip from an ambient atmosphere; and
        at least one suction device adapted to provide an underpressure to the vent opening;
    wherein the measuring device further comprises at least one valve or is connectable to the at least one valve, and
    wherein the sealing element comprises at least one suction spout configured to reversibly connect the vent opening of the capillary channel to the suction device,
    wherein the suction spout is configured to fully or partially surround the vent opening and to seal the vent opening from the ambient atmosphere.

2. The test system according to claim 1, wherein the valve comprises a three-way valve, and wherein the vent opening is connected to a vent port or to the suction device.

3. The test system according to claim 1, wherein the valve is configured to vent the vent opening of the test strip when the measuring device interacts with the test strip.

4. The test system according to claim 1, wherein the valve is configured to vent the vent opening of the test strip when the test strip is inserted in the measuring device.

5. The test system according to claim 1, wherein the suction spout comprises the at least one valve or is connectable to the at least one valve, wherein the at least one valve is configured to vent the vent opening when the suction spout is connected to the vent opening.

6. The test system according to claim 5, wherein the valve is configured to vent an interior of the suction spout.

7. The test system according to claim 1, wherein the capillary channel further comprises at least one hydrophilic section and/or at least one hydrophobic section configured to control a movement of the sample of bodily fluid.

8. The test system according to claim 7, wherein the capillary channel comprises at least one hydrophobic section spaced apart from the inlet opening, wherein the hydrophobic section is adapted to stop a flow of the bodily fluid, wherein the measuring device is adapted to overcome the stop of the flow of the bodily fluid by applying the underpressure to the vent opening, thereby fully or partially moving the sample of the bodily fluid over the hydrophobic section.

9. The test system according to claim 8, wherein the measuring device is adapted to allow for a movement of the sample of the bodily fluid from the inlet opening to the hydrophobic section by capillary force, without applying an underpressure and, consequently, to apply the underpressure to overcome the stopping of the movement of the sample by applying the underpressure to the vent opening.

10. A method for controlling a transport of a sample of bodily fluid within a test strip, the method comprising using a test system according to claim 1, the method comprising the following steps:
    a) connecting the test strip to the measuring device;
    b) connecting the vent opening to an ambient atmosphere;
    c) applying the sample of bodily fluid to the inlet opening of the capillary channel;
    d) generating an initial flow of the sample of the bodily fluid by capillary force; and
    e) generating an underpressure in the capillary channel and achieving a subsequent flow of the sample of the bodily fluid, thereby transporting the sample of bodily fluid to the at least one zone selected from the group consisting of a detection zone and a reagent zone.

11. The method according to claim 10, wherein the valve of the measuring device is configured to be moved to at least one open position and to at least one closed position, wherein in the open position the vent opening is connected to the ambient atmosphere and in the closed position the vent opening is connected to the suction device, wherein during one or more of step a), step b), step c) and step d) the valve is in the open position and wherein during step e) the valve is in the closed position.

12. A method for analyzing a sample of a bodily fluid, the method comprising transporting the sample of the bodily fluid by using the method according to claim 11, wherein the method further comprising conducting an analysis of the sample of the bodily fluid by using the test strip and at least one analysis device of the measuring device.

13. A test system for analyzing a sample of a bodily fluid comprising:
    at least one test strip comprising at least one capillary channel, the capillary channel comprising
        an inlet opening configured to receive the sample of the bodily fluid;
        a vent opening configured to provide an air vent to the capillary channel; and
        at least one zone selected from the group consisting of a detection zone and a reagent zone;
    at least one measuring device configured for interacting with the test strip, the measuring device comprising
        at least one sealing element configured for hermetically sealing the vent opening of the test strip from an ambient atmosphere; and
        at least one suction device adapted to provide an underpressure to the vent opening;
    wherein the measuring device further comprises at least one valve or is connectable to the at least one valve, and
    wherein the sealing element comprises at least one housing configured to surround the vent opening of the capillary channel, wherein the housing comprises a test strip slot through which the test strip is at least partially introduced into the housing, and wherein the housing is configured to provide a circumferential seal around the test strip at the test strip slot such that an interior space of the housing is sealed against the ambient atmosphere.

14. The test system according to claim 13, wherein the housing comprises the at least one valve or is connected to the at least one valve, wherein the valve is configured to vent the vent opening of the test strip when the test strip is at least partially introduced into the housing.

15. The test system according to claim 14, wherein the valve is configured to vent the interior space of the housing.

16. The test system according to claim 13, wherein the valve comprises a three-way valve, and wherein the vent opening is connected to a vent port or to the suction device.

17. The test system according to claim 13, wherein the valve is configured to vent the vent opening of the test strip when the measuring device interacts with the test strip.

18. The test system according to claim 13, wherein the valve is configured to vent the vent opening of the test strip when the test strip is inserted in the measuring device.

19. The test system according to claim 13, wherein the capillary channel further comprises at least one hydrophilic section and/or at least one hydrophobic section configured to control a movement of the sample of bodily fluid.

20. The test system according to claim 19, wherein the capillary channel comprises at least one hydrophobic section spaced apart from the inlet opening, wherein the hydrophobic section is adapted to stop a flow of the bodily fluid, wherein the measuring device is adapted to overcome the stop of the flow of the bodily fluid by applying the underpressure to the vent opening, thereby fully or partially moving the sample of the bodily fluid over the hydrophobic section.

21. The test system according to claim 20, wherein the measuring device is adapted to allow for a movement of the sample of the bodily fluid from the inlet opening to the hydrophobic section by capillary force, without applying an underpressure and, consequently, to apply the underpressure to overcome the stopping of the movement of the sample by applying the underpressure to the vent opening.

* * * * *